(12) United States Patent
Adhikary et al.

(10) Patent No.: US 9,615,342 B2
(45) Date of Patent: Apr. 4, 2017

(54) METHOD OF DETECTING CELL IDENTITY AND FRAME NUMBER INFORMATION

(71) Applicant: TELEFONAKTIEBOLAGET LM ERICSSON (PUBL), Stockholm (SE)

(72) Inventors: Ansuman Adhikary, Santa Clara, CA (US); Niklas Johansson, Uppsala (SE); Yi-Pin Eric Wang, Fremont, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/004,325

(22) Filed: Jan. 22, 2016

(65) Prior Publication Data

US 2016/0219537 A1    Jul. 28, 2016

Related U.S. Application Data

(60) Provisional application No. 62/108,383, filed on Jan. 27, 2015.

(51) Int. Cl.
*H04J 11/00* (2006.01)
*H04W 56/00* (2009.01)
(Continued)

(52) U.S. Cl.
CPC ......... *H04W 56/001* (2013.01); *H04L 45/745* (2013.01); *H04W 4/005* (2013.01);
(Continued)

(58) Field of Classification Search
CPC ........ H04J 11/00; H04J 11/0069; H04J 13/00; H04J 13/0029; H04W 56/00; H04W 56/0015; H04L 27/26
See application file for complete search history.

(56) References Cited

U.S. PATENT DOCUMENTS

2008/0181194 A1   7/2008   Lindoff et al.
2009/0323629 A1   12/2009  Lindoff et al.
(Continued)

FOREIGN PATENT DOCUMENTS

KR   20070079942 A * 8/2007 ............ H04L 27/26

OTHER PUBLICATIONS

Ericsson LM: "On NB M2M Cell Search Mechanism 1 Introduction 2 Background". 3GPP Draft; GP-150143, On NB M2M Cell Search Mechanism, 3rd Generation Partnership Project (3GPP), Mobile Competence Centre ; 650, Route des Lucioles ; F-06921 Sophia-Antipolis Cedex ; France vol. TSG GERAN, No. Shanghai, P.R. China; 20150309-20150313 Mar. 8, 2015 (Mar. 8, 2015).
(Continued)

*Primary Examiner* — Blane Jackson

(57) ABSTRACT

A method in a node comprises receiving a signal, and collecting a first set of sequences corresponding to a first piece of cellular information and a second set of sequences corresponding to a second piece of cellular information over multiple frames of the received signal, wherein the second piece of cellular information is encoded based at least in part on the first piece of cellular information. The method further comprises processing the first set of sequences corresponding to the first piece of cellular information to determine the first piece of cellular information, and processing, using the determined first piece of cellular information, the second set of sequences corresponding to the second piece of cellular information to determine the second piece of cellular information simultaneously with the determination of the first piece of cellular information.

25 Claims, 12 Drawing Sheets

(51) Int. Cl.
  *H04L 27/26* (2006.01)
  *H04W 64/00* (2009.01)
  *H04L 12/741* (2013.01)
  *H04W 4/00* (2009.01)
  *H04W 48/16* (2009.01)
  *H04W 88/02* (2009.01)
  *H04B 1/7083* (2011.01)

(52) U.S. Cl.
  CPC ......... *H04W 48/16* (2013.01); *H04W 64/003* (2013.01); *H04B 1/7083* (2013.01); *H04J 11/0069* (2013.01); *H04L 27/2656* (2013.01); *H04W 88/02* (2013.01)

(56) References Cited

U.S. PATENT DOCUMENTS

| | | | |
|---|---|---|---|
| 2012/0314870 A1 | 12/2012 | Kim et al. | |
| 2014/0321370 A1* | 10/2014 | Chen | H04L 1/0038 370/329 |
| 2015/0044642 A1* | 2/2015 | Resig | G06F 8/33 434/118 |
| 2016/0165613 A1* | 6/2016 | Gowda | H04J 11/0076 370/335 |
| 2016/0218821 A1* | 7/2016 | Adhikary | H04J 11/0069 |

OTHER PUBLICATIONS

Ericsson LM: "Pseudo CR 45.820—Alternative NB-M2M Cell Search Procedure". 3GPP Draft; GP-150296, PCR—NB M2M Cell Search Mechanism, 3rd Generation Partnership Project (3GPP), Mobile Competence Centre ; 650, Route des Lucioles ; F-06921 Sophia-Antipolis Cedex; France vol. TSG GERAN, No. Shanghai, P.R. China; 20150309-20150313 Mar. 12, 2015 (Mar. 12, 2015).

NB M2M—Cell Search Mechanism. 3GPP GERAN #64 GP-140864. San Francisco, USA Agenda Item: 7.1.5.3.5. Source: Huawei Technologies Co., Ltd., HiSilicon Technologies Co., Ltd. Nov. 17-21, 2014.

NB M2M—Frame Index Indication Design. 3GPP GERAN #64 GP-140861. San Francisco, USA Agenda Item: 7.1.5.3.5. Source: Huawei Technologies Co., Ltd., HiSilicon Technologies Co., Ltd. Nov. 17-21, 2014.

NB M2M—Overview of the Physical Layer Design. 3GPP TSG GERAN #63 GP-140563. Ljubljana, Slovenia Agenda Item: 7.1.5. 3.5. Source: Huawei Technologies Co., Ltd. , HiSilicon Technologies Co., Ltd. Aug. 25-29, 2014.

Vodafone. New Study Item on Cellular System Support for Ultra Low Complexity and Low Throughput Internet of Things. 3GPP TSG-GERAN Meeting #62 GP-140421. Valencia, Spain, rev of GP-140418 rev of GP-140411. May 26-30, 2014.

* cited by examiner

METHOD OF DETECTING CELL IDENTITY AND FRAME NUMBER INFORMATION

PRIORITY

This application claims the benefit under 35 U.S.C. §119(e) of the priority of U.S. Provisional Application 62/108,383 filed on Jan. 27, 2015, entitled "Method of Detecting Cell Identity and Frame Number Information," the entire disclosure of which is hereby incorporated by reference.

TECHNICAL FIELD

The present disclosure relates, in general, to wireless communications and, more particularly, to detecting cell identity and frame number information.

BACKGROUND

Cellular communication systems are being developed and improved for machine type communication (MTC), communication characterized by lower demands on data rates than for example mobile broadband, but with higher requirements on, for example, low cost device design, better coverage, and an ability to operate for years on batteries without charging or replacing the batteries. In the 3GPP GERAN specification group, cellular communication systems are being improved and developed in the feasibility study named "Cellular System Support for Ultra Low Complexity and Low Throughput Internet of Things." GSM is being evolved, and new "clean slate" systems, (systems not based on current cellular systems, are being developed.

One "clean slate" solution, called narrowband machine-to-machine (NB M2M), is a narrowband system with a carrier bandwidth of 200 kHz that targets improved coverage compared to GSM systems, long battery life, and low complexity communication design. One intention with this solution is to deploy it in spectrum that is currently used for GSM, by reducing the bandwidth used by GSM and deploying NB M2M in the spectrum that becomes available. Another intention is to reuse existing GSM sites for the deployment of NB M2M.

In cellular communication systems, devices use a cell search procedure (or synchronization procedure) to understand which cell(s) to connect to. A cell search procedure typically includes detecting a suitable cell to camp on, and for that cell, obtaining the symbol and frame timing and synchronizing to the carrier frequency. The cell search procedure for NB M2M is described in GP-140864, "NB M2M—Cell Search Mechanism," and GP-140861, "NB M2M—Frame Index Indication Design."

After switching on, an MTC device first needs to search for a signal in a viable frequency band. Signal detection is performed on the basis of comparing the amplitude of the peak from a correlation based detector with a pre-determined threshold. This is achieved by correlating the received signal with a known sequence, or a set of known sequences. In NB M2M systems, in order to fulfill the requirements of extended coverage, the cell synchronization procedure needs to be operable at very low signal to noise ratios (SNR).

In order to achieve this functionality, existing approaches for estimating frame timing, frequency offset and other relevant quantities require the accumulation of the processed correlator output over multiple frames, in order to obtain a sufficiently high peak. There are two separate sequences, namely the cell identification sequence (CIS) to detect the cell ID and the frame index indication sequence (FIIS) to obtain the frame number.

A problem with the typical NB M2M approach for cell synchronization stems from the design of the CIS and FIIS. The CIS sequence used is unique to a particular cell, while the FIIS is determined by two sequences: one sequence is used for the frame number of the current frame, and this is then scrambled with a cell specific scrambling sequence in order to provide protection from inter-cell interference. As a result, detection of the frame number requires knowing the cell specific scrambling sequence, which in turn requires knowing the cell ID. Therefore, in order to obtain the cell ID as well as the frame number, a sequential detection needs to be performed (i.e., the cell ID is obtained first, which is then used to detect the frame number). This increases the synchronization time, which may not be desirable.

SUMMARY

To address the foregoing problems, disclosed is a method in a node. The method comprises receiving a signal, and collecting a first set of sequences corresponding to a first piece of cellular information and a second set of sequences corresponding to a second piece of cellular information over multiple frames of the received signal, the first set of sequences comprising a plurality of different versions of a first portion of the received signal corresponding to the first piece of cellular information and the second set of sequences comprising a plurality of different versions of a second portion of the received signal corresponding to the second piece of cellular information, wherein the second piece of cellular information is encoded based at least in part on the first piece of cellular information. The method further comprises processing the first set of sequences corresponding to the first piece of cellular information to determine the first piece of cellular information, and processing, using the determined first piece of cellular information, the second set of sequences corresponding to the second piece of cellular information to determine the second piece of cellular information simultaneously with the determination of the first piece of cellular information.

In certain embodiments, the node may comprise one of a wireless device and a network node. The first piece of cellular information may comprise cell identity information. The second piece of cellular information may comprise frame number information.

In certain embodiments, collecting the first set of sequences corresponding to the first piece of cellular information and the second set of sequences corresponding to the second piece of cellular information over multiple frames of the received signal may comprise: extracting, from a first frame of the received signal, a first version of the first portion of the received signal corresponding to the first piece of cellular information and a first version of the second portion of the received signal corresponding to the second piece of cellular information; and extracting, from a second frame of the received signal, a second version of the first portion of the received signal corresponding to the first piece of cellular information and a second version of the second portion of the received signal corresponding to the second piece of cellular information. The method may further comprise storing, in a memory, the first and second versions of the second portion of the received signal corresponding to the second piece of cellular information.

In certain embodiments, processing the first set of sequences corresponding to the first piece of cellular information to determine the first piece of cellular information may comprise: correlating the first version of the first portion of the received signal corresponding to the first piece of cellular information with one or more sequences to produce a first output, the first output comprising a set of correlation values; correlating the second version of the first portion of the received signal corresponding to the first piece of cellular information with one or more sequences to produce a second output, the second output comprising a set of correlation values; combining the first output and the second output to obtain a first set of accumulated correlation values; and determining the first piece of cellular information based at least in part on the first set of accumulated correlation values.

In certain embodiments, processing, using the determined first piece of cellular information, the second set of sequences corresponding to the second piece of cellular information to determine the second piece of cellular information simultaneous with the determination of the first piece of cellular information may comprise: applying the first piece of cellular information to the stored first and second versions of the second portion of the received signal corresponding to the second piece of cellular information to generate modified first and second versions of the second portion of the received signal, wherein the modified first and second versions of the second portion of the received signal are no longer dependent on the first piece of cellular information; correlating the modified first version of the second portion of the received signal corresponding to the second piece of cellular information with a first set of sequences based on a first set of frame number hypotheses to obtain a first set of correlation values; correlating the modified second version of the second portion of the received signal corresponding to the second piece of cellular information with a second set of sequences based on a second set of frame number hypotheses to obtain a second set of correlation values; combining the first set of correlation values and the second set of correlation values to generate a second set of accumulated correlation values; and determining the second piece of cellular information based at least in part on the generated second set of accumulated correlation values.

The first set of frame number hypotheses may comprise $\{0, 1, \ldots, K\}$, where K is an integer, and the second set of frame number hypotheses may comprise $\{1, 2, \ldots, (K+1)$ modulo $N\}$, where N corresponds to a highest frame number allowed. Applying the first piece of cellular information to the stored first and second versions of the second portion of the received signal to generate modified first and second versions of the second portion of the received signal may comprise descrambling, using the first piece of cellular information, the stored first and second versions of the second portion of the received signal corresponding to the second piece of cellular information, wherein: the modified first version of the second portion of the received signal comprises a descrambled first version of the second portion of the received signal; and the modified second version of the second portion of the received signal comprises a descrambled second version of the second portion of the received signal.

Also disclosed is a network node. The network node comprises one or more processors. The one or more processors are configured to receive a signal, and to collect a first set of sequences corresponding to a first piece of cellular information and a second set of sequences corresponding to a second piece of cellular information over multiple frames of the received signal, the first set of sequences comprising a plurality of different versions of a first portion of the received signal corresponding to the first piece of cellular information and the second set of sequences comprising a plurality of different versions of a second portion of the received signal corresponding to the second piece of cellular information, wherein the second piece of cellular information is encoded based at least in part on the first piece of cellular information. The one or more processors are further configured to process the first set of sequences corresponding to the first piece of cellular information to determine the first piece of cellular information, and to process, using the determined first piece of cellular information, the second set of sequences corresponding to the second piece of cellular information to determine the second piece of cellular information simultaneously with the determination of the first piece of cellular information.

Also disclosed is a computer program product. The computer program product comprises instructions stored on non-transient computer-readable media which, when executed by one or more processors, perform the acts of receiving a signal and collecting a first set of sequences corresponding to a first piece of cellular information and a second set of sequences corresponding to a second piece of cellular information over multiple frames of the received signal, the first set of sequences comprising a plurality of different versions of a first portion of the received signal corresponding to the first piece of cellular information and the second set of sequences comprising a plurality of different versions of a second portion of the received signal corresponding to the second piece of cellular information, wherein the second piece of cellular information is encoded based at least in part on the first piece of cellular information. The instructions, when executed by the one or more processors, perform the acts of processing the first set of sequences corresponding to the first piece of cellular information to determine the first piece of cellular information, and processing, using the determined first piece of cellular information, the second set of sequences corresponding to the second piece of cellular information to determine the second piece of cellular information simultaneously with the determination of the first piece of cellular information.

Certain embodiments of the present disclosure may provide one or more technical advantages. As one example, certain embodiments may be applied to scenarios where the problem is to detect two quantities of interest simultaneously, where the first quantity (or first piece of information) is separately encoded and the encoding of the second quantity (or second piece of information) is dependent on the first quantity. For example, certain embodiments may allow detection of both the cell ID and frame number simultaneously, without the need for sequential detection. As another example, certain embodiments may advantageously mitigate some of the problems associated with the receiver signal processing for cell search in NB M2M systems. For example, certain embodiments may achieve faster synchronization, improved receiver sensitivity for cell search, and/or lower complexity. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
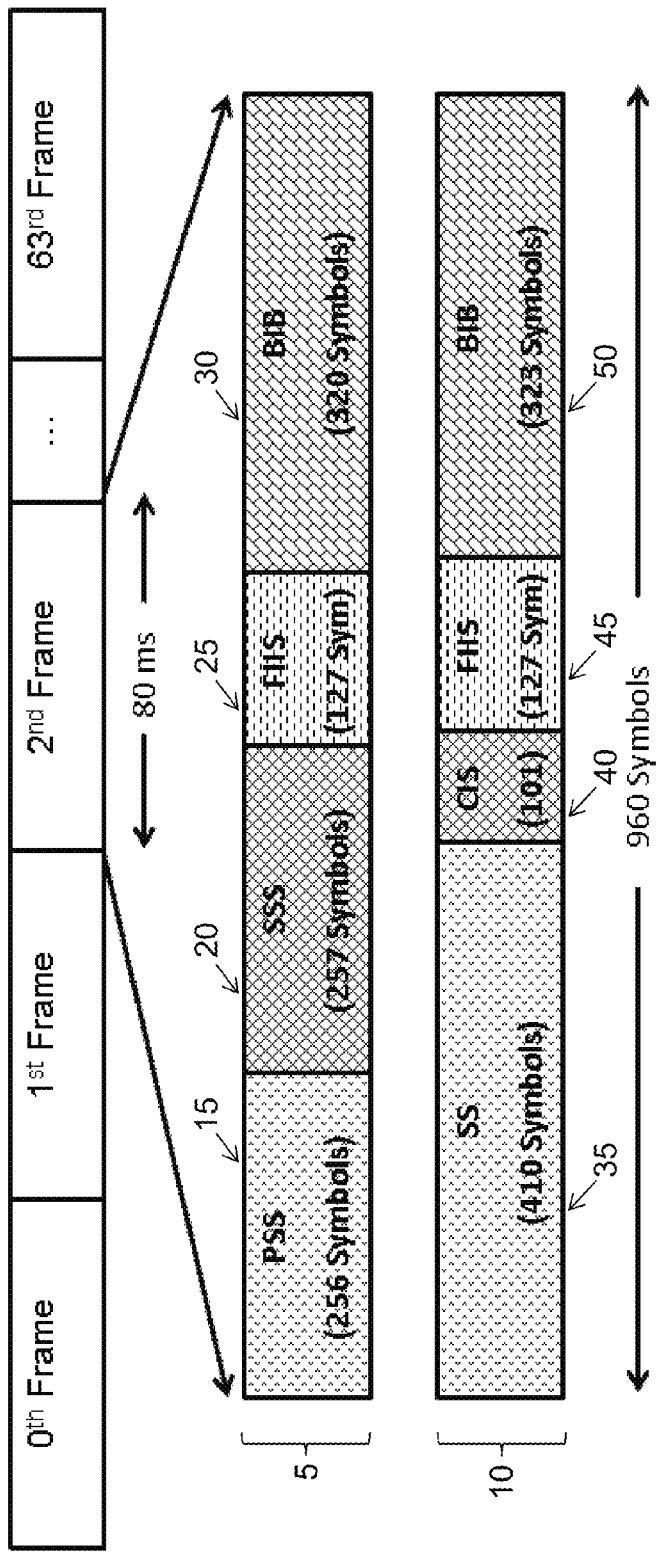
FIG. 1 illustrates a frame structure for PBSCH, in accordance with certain embodiments.

As described above, a problem with the typical NB M2M approach for cell synchronization stems from the design of the CIS and FIIS. The CIS sequence used is unique to a particular cell, while the FIIS is determined by two sequences: one sequence is used for the frame number of the current frame, and this is then scrambled with a cell specific scrambling sequence in order to provide protection from inter-cell interference. As a result, detection of the frame number requires knowing the cell specific scrambling sequence, which in turn requires knowing the cell ID. Therefore, in order to obtain the cell ID as well as the frame number, a sequential detection needs to be performed (i.e., the cell ID is obtained first, which is then used to detect the frame number). As noted above, in NB M2M systems an accumulation of the correlator output over multiple frames is required to perform correct detection when the SNR is low, which is often the case for NB M2M systems that are designed to operate in low SNR. Therefore, a certain number of frames are first required to obtain the correct cell ID, and then a certain number of frames are further required to obtain the frame number. This increases the synchronization time.

The present disclosure contemplates various embodiments that may alleviate these and other deficiencies of previous approaches. In certain embodiments, both the cell ID as well as the frame number are detected simultaneously without requiring any sequential detection process. This is achieved with only a moderate increase in complexity. As a result, the various embodiments may advantageously avoid the increase in synchronization time associated with existing approaches. Although the embodiments may be described herein with reference to particular scenarios, the solution is general and can be applied to any scenario where the problem is to detect two quantities of interest simultaneously, where the first quantity (or first piece of information) is separately encoded and the encoding of the second quantity (or second piece of information) is dependent on the first quantity.

For example, in the cell synchronization procedure the first quantity is the cell ID, which is encoded as a unique sequence particular to a cell, and the second quantity is the frame number, which is encoded with a unique sequence particular to the current frame and then scrambled with another sequence specific to the cell. In certain embodiments, a node (such as a wireless device or a network node) receives a signal. The node collects a first set of sequences (e.g., CIS) corresponding to a first piece of cellular information (e.g., cell ID) and a second set of sequences (e.g., FIIS) corresponding to a second piece of cellular information (e.g., frame number) over multiple frames of the received signal. The first set of sequences may comprise a plurality of different versions of a first portion of the received signal corresponding to the first piece of cellular information, and the second set of signals may comprise a plurality of different versions of a second portion of the received signal corresponding to the second piece of cellular information. The second piece of cellular information may be encoded based at least in part on the first piece of cellular information.

In certain embodiments, the information corresponding to both the first piece of cellular information and the second piece of cellular information (i.e., the received sequences corresponding to the cell ID and frame number) are stored in a buffer. The node processes the first set of sequences corresponding to the first piece of cellular information to determine the first piece of cellular information. The node then processes, using the determined first piece of cellular information, the second set of sequences corresponding to the second piece of cellular information to determine the second piece of cellular information simultaneously with the determination of the first piece of cellular information. In other words, after the first quantity is correctly detected (which in this example is the cell ID), the information from this quantity is first applied to the stored information pertaining to the second quantity to remove the dependence on the first quantity. In this example, this means descrambling the portion of the received sequence corresponding to the frame number with the cell specific scrambling code. After the dependence is removed, the second quantity is detected by applying the corresponding procedure specific to that quantity. Thus, both the cell ID and frame number may be detected simultaneously, avoiding the need for sequential detection that would unnecessarily prolong the synchronization time. As used herein, "detected simultaneously" or "simultaneous detection" refers to an ability to detect the second piece of information (e.g., frame number) as soon as the first piece of information is determined (e.g., cell ID), without the need for reception of additional frames.

In the existing NB M2M cell search procedure described in GP-140864, a physical channel called Physical Broadcast Synchronization Channel (PBSCH) is dedicated to carrying the synchronization signals, along with the broadcast system information. A separate downlink physical channel per base station is reserved for PBSCH, while the data channels are multiplexed by frequency division multiplexing (FDM). In addition, the PBSCH operates with a reuse factor of 1, implying that the PBSCH of neighboring cells are completely overlapped in the frequency domain. This has the advantage of a reduction in search complexity, but also results in interference from all the other cells using the PBSCH.

Figure 2:
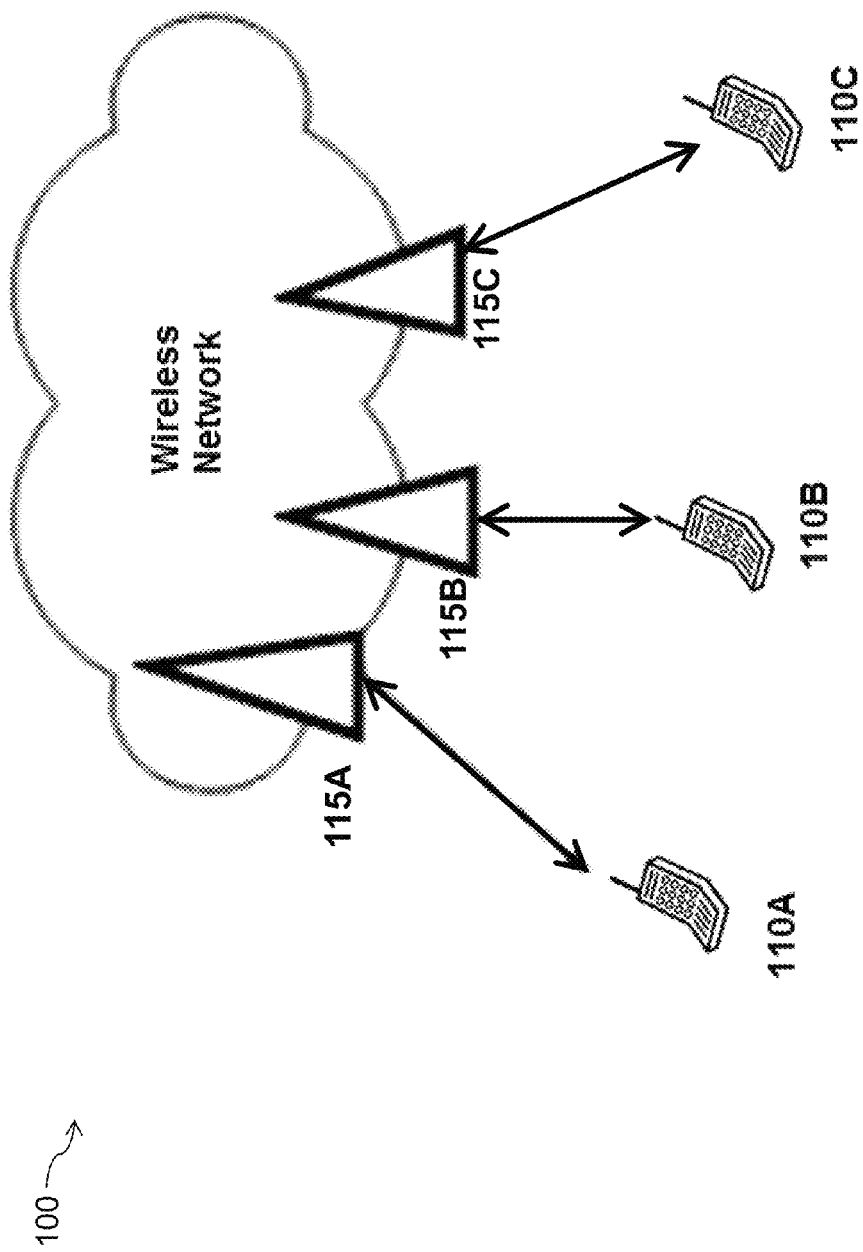
FIG. 2 is a schematic diagram of a wireless communication network, in accordance with certain embodiments.

FIG. 1 illustrates a proposed frame structure for PBSCH, in accordance with certain embodiments. More particularly, FIG. 1 illustrates the frame structure of existing approach 5 in comparison with the proposed frame structure of PBSCH 10. The frame structure of existing approach 5 includes PSS 15, SSS 20, FIIS 25, and BIB 30. As shown in FIG. 2, PSS 15 has a length of 256 symbols, SSS 20 has a length of 257 symbols, FIIS 25 has a length of 127 symbols, and BIB 30 has a length of 320 symbols.

In contrast to the frame structure of the existing NB M2M approach 5, in certain embodiments the proposed frame structure 10 may be used for the cell synchronization procedure. The proposed frame structure of PBSCH 10 includes SS 35, CIS 40, FIIS 45, and BIB 50. Unlike the existing NB M2M approach, which uses separate sequences PSS 15 and SSS 20 for determining frame timing as well as frequency offset, SS 35 is a single sequence that can be used for both the frame timing estimation and frequency offset correction. CIS 40 is a separate sequence, and is used to determine the cell ID. FIIS 40 is a third sequence reserved to determine the frame number.

In the example embodiment illustrated in FIG. 1, SS 35 has a length of 410 symbols, CIS 40 has a length of 101 symbols, and FIIS 45 has a length of 127 symbols. The remaining 322 symbols of BIB 50 are used for carrying the broadcast information, making the total number of symbols in the frame equal to 960. Other embodiments may have SS, CIS, and FIIS sequences of different symbol lengths. In some cases, the symbol length of the various sequences may vary according to particular implementations. For example, the length of CIS 240 may be increased in cases where more cell IDs may be desirable.

In certain embodiments, an MTC device first obtains the frame timing using SS 35, and then uses SS 35 for determining the frequency offset. After the frame timing is found and frequency offset corrected, CIS 40 may be used to determine the cell ID. After the cell ID is determined, FIIS 45 indicates the frame number.

Compared to the existing NB M2M design in GP-140864, the design proposed herein may have the benefit of faster synchronization, reduced complexity requirements and support for more unique cell IDs. Certain embodiments include the introduction of two different sequences (i.e., CIS 40 for cell identification and FIIS 45 for frame number). In particular embodiments, FIIS 45 is composed of a dedicated sequence for the frame number which is scrambled with a cell specific sequence. As a result, correct detection of the frame number requires knowledge of the cell ID, which has to be obtained from CIS 40. Existing approaches may perform sequential detection (i.e., detect the cell ID first and then detect the frame number). In order to satisfy the requirements of extended coverage, however, NB M2M systems need to operate at very low SNRs, requiring processing of the output over multiple frames in order to obtain correct detection. A sequential detection comes at a disadvantage because it requires double the processing time since there are two different sequences—with the second sequence depending on the first—thereby increasing the time required for synchronization.

In such a scenario, it may be desirable to have a correlation over 100 different sequences for obtaining the cell ID, and a correlation over 6400 different sequences for obtaining the frame number (64 sequences for frame number combined with 100 cell-specific scrambling sequences give rise to a total of 6400 sequences). A correlation over 6400 sequences might be infeasible for MTC receivers that need to be designed for low complexity. Thus, there is a need for an alternative method for performing joint processing over the received signals corresponding to both the CIS 40 and FIIS 45. Accordingly, certain embodiments described herein may use an alternative design that performs joint processing without requiring such high receiver complexity. In certain embodiments, both the cell ID as well as the frame number are detected simultaneously without requiring any sequential detection process. This is achieved with only a moderate increase in complexity.

SS 35 may be designed in any suitable manner, and the design of SS 35 may vary according to particular implementations. In some cases, SS 35 may be created by differentially encoding a base sequence that has suitable autocorrelation properties. For example, low autocorrelation for non-zero lag, and a high correlation for zero lag. Depending on the scenario, some possibilities include a Zadoff-Chu sequence, an m-sequence, a Gold sequence, or other sequence with suitable correlation properties. By using a differentially encoded sequence, the time offset estimation is robust to large frequency errors. Thus, good time offset estimation accuracy can be achieved, independent of frequency error. When the time offset has been determined, the SS 35 is reused for frequency offset estimation. Since SS 35 is a known signal with unit amplitude, the sequence is easily reused for frequency offset estimation.

In one example embodiment, SS 35 is a length 410 BPSK modulated differentially encoded Zadoff-Chu sequence of length 409, and is defined as:

$$\tilde{S}(n+1) = \tilde{d}(n)\tilde{S}(n)$$
$$\tilde{d}(n) = e^{-j\pi\frac{n(n+1)}{409}}, \tilde{S}(0) = 1 \; n = 1, 2, \ldots, 409$$

In certain embodiments, a longer length is used than for PSS 15 in the frame structure of existing approach 5. This may advantageously reduce the number of frames that need to be accumulated for sufficient estimation accuracy in low SNR (i.e., bad coverage), enabling a shorter synchronization time while at the same time allowing the new cell search solution to use no more symbols than are used in the existing design. In such an example embodiment, the exact length of 409 is chosen because it is a prime number, and Zadoff-Chu sequences with prime number lengths have good autocorrelation properties. Any other suitable lengths may be used.

CIS 40 may be designed in any suitable manner, and the design of CIS 40 may vary according to particular implementations. For example, in one example embodiment CIS 40 for the $k^{th}$ cell is a length-101 Zadoff-Chu sequence, given as:

$$\tilde{c}_k(n) = e^{-jk\pi\frac{n(n+1)}{101}} \; n = 0, 1, 2, \ldots, 100$$

Using Zadoff-Chu sequences for both SS 35 and CIS 40 provides the flexibility and advantage to design two Zadoff-Chu sequences with prime number lengths, such that the total length is comparable to the combined length of the PSS and SSS in the frame structure of existing approach 5. It should be noted, however, that in alternative embodiments other sequences than Zadoff-Chu can be used for SS 35, for CIS 40, and for FIIS 45. For example, in certain embodiments m-sequences, Gold sequences, or other sequences with suitable correlation properties may be used. Suitable correlation properties may include low autocorrelation at non-zero correlation lag, and high autocorrelation at zero lag, and low cross-correlation between different sequences used for the same purpose (e.g., different CIS corresponding to different cells).

In certain embodiments, the time and frequency offset estimates may be used to locate a cell ID signal time, to frequency correct it, and to detect the cell ID. CIS 40 may be transmitted by the base station in each cell in each frame. In addition, the time and frequency offset estimates, and the detected cell ID, may be used to locate a frame ID signal in time, to frequency correct it, to descramble it, and to detect the frame ID. FIIS 45 is transmitted in each frame from the base station, and is scrambled with the cell ID.

FIIS 45 may be designed in any suitable manner, and the design of FIIS 45 may vary according to particular implementations. In one example embodiment, the frame index indication sequence $\tilde{f}_c^m(n)$ for the $m^{th}$ frame in the $c^{th}$ cell is a length-127 scrambled Zadoff-Chu sequence, where the scrambling sequence is specific for a particular cell. This is given by:

$$\tilde{f}_c^m(n) = \tilde{e}_m(n) G_c(n),$$

where m indicates the frame number, $\tilde{e}_m(n)$ is generated as $$\tilde{e}_m(n) = e^{-jm\pi \frac{n(n+1)}{127}} \quad n = 0, 1, 2, \ldots, 126$$

and $G_c(n)$ denotes the BPSK modulated sequence $g_c(n)$ generated as $$g_c(n) = x(n+N_G) \oplus y_c(n+N_G)$$

$$x(n+31) = x(n+3) \oplus x(n)$$

$$y_c(n+31) = y_c(n+3) \oplus y_c(n+2) \oplus y_c(n+1) \oplus y_c(n)$$

with $N_G=1600$, $x(0)=1$, $x(n)=0$, $n=1, 2, \ldots, 30$ and $y_c(n)$ initialized as $$c = \sum_{m=0}^{30} y(m) 2^m, \quad c = 1, 2, \ldots, 100$$

FIG. 2 is a block diagram illustrating an embodiment of a wireless communication network 100, in accordance with certain embodiments. Network 100 includes one or more UE(s) 110 (which may be interchangeably referred to as wireless devices 110, MTC UE 110, or MTC device 110), network node(s) 115 (which may be interchangeably referred to as eNodeBs (eNBs) 115). UEs 110 may communicate with network nodes 115 over a wireless interface. For example, UE 110A may transmit wireless signals to one or more of network nodes 115, and/or receive wireless signals from one or more of network nodes 115. The wireless signals may contain voice traffic, data traffic, control signals, and/or any other suitable information. In some embodiments, an area of wireless signal coverage associated with a network node 115 may be referred to as a cell. In some embodiments, UEs 110 may have device-to-device (D2D) capability. Thus, UEs 110 may be able to receive signals from and/or transmit signals directly to another UE. For example, UE 110A may be able to receive signals from and/or transmit signals to UE 110B.

In certain embodiments, network nodes 115 may interface with a radio network controller. The radio network controller may control network nodes 115 and may provide certain radio resource management functions, mobility management functions, and/or other suitable functions. In certain embodiments, the functions of the radio network controller may be included in network node 115. The radio network controller may interface with a core network node. In certain embodiments, the radio network controller may interface with the core network node via an interconnecting network. The interconnecting network may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for UEs 110. UEs 110 may exchange certain signals with the core network node using the non-access stratum layer. In non-access stratum signaling, signals between UEs 110 and the core network node may be transparently passed through the radio access network. In certain embodiments, network nodes 115 may interface with one or more network nodes over an internode interface. For example, network nodes 115A and 115B may interface over an X2 interface.

As described above, example embodiments of network 100 may include one or more wireless devices 110, and one or more different types of network nodes capable of communicating (directly or indirectly) with wireless devices 110.

In some embodiments, the non-limiting term UE is used. UEs 110 described herein can be any type of wireless device capable of communicating with network nodes 115 or another UE over radio signals. UE 110 may also be a radio communication device, target device, D2D UE, machine-type-communication UE or UE capable of machine to machine communication (M2M), low-cost and/or low-complexity UE, a sensor equipped with UE, Tablet, mobile terminals, smart phone, laptop embedded equipped (LEE), laptop mounted equipment (LME), USB dongles, Customer Premises Equipment (CPE), etc. UE 110 may operate under either normal coverage or enhanced coverage with respect to its serving cell. The enhanced coverage may be interchangeably referred to as extended coverage. UE 110 may also operate in a plurality of coverage levels (e.g., normal coverage, enhanced coverage level 1, enhanced coverage level 2, enhanced coverage level 3 and so on).

Also, in some embodiments generic terminology, "radio network node" (or simply "network node") is used. It can be any kind of network node, which may comprise a base station (BS), radio base station, Node B, base station (BS), multi-standard radio (MSR) radio node such as MSR BS, evolved Node B (eNB), network controller, radio network controller (RNC), base station controller (BSC), relay node, relay donor node controlling relay, base transceiver station (BTS), access point (AP), radio access point, transmission points, transmission nodes, Remote Radio Unit (RRU), Remote Radio Head (RRH), nodes in distributed antenna system (DAS), Multi-cell/multicast Coordination Entity (MCE), core network node (e.g., MSC, MME etc), O&M, OSS, SON, positioning node (e.g., E-SMLC), MDT, or any suitable network node.

The terminology such as network node and UE should be considered non-limiting and does in particular not imply a certain hierarchical relation between the two; in general "eNodeB" could be considered as device 1 and "UE" device 2, and these two devices communicate with each other over some radio channel. The term "node" used herein may be used to denote a UE or a network node.

Example embodiments of UE 110, network nodes 115, and other network nodes (such as radio network controller or core network node) are described in more detail below with respect to FIGS. 7-12.

Although FIG. 2 illustrates a particular arrangement of network 100, the present disclosure contemplates that the various embodiments described herein may be applied to a variety of networks having any suitable configuration. For example, network 100 may include any suitable number of UEs 110 and network nodes 115, as well as any additional elements suitable to support communication between UEs or between a UE and another communication device (such as a landline telephone). Furthermore, although certain embodiments may be described as implemented in a Long Term Evolution (LTE) network, the embodiments may be implemented in any appropriate type of telecommunication system supporting any suitable communication standards and using any suitable components, and are applicable to any radio access technology (RAT) or multi-RAT systems in which the UE receives and/or transmits signals (e.g., data). For example, the various embodiments described herein may be applicable to LTE, LTE-Advanced, UMTS, HSPA, GSM, cdma2000, WiMax, WiFi, another suitable radio access technology, or any suitable combination of one or more radio access technologies. Although certain embodiments may be described in the context of wireless transmissions in the downlink, the present disclosure contemplates that the various embodiments are equally applicable in the uplink.

During synchronization with network node 115, wireless device 110 (which may be an MTC device), receives a signal. In some cases, the signal may be transmitted by network node 115 using the proposed frame structure 10 described above in relation to FIG. 1 for the cell synchronization procedure. Wireless device 110 first obtains the frame timing (for example, using SS 35 described above in relation to FIG. 1). Wireless device 110 may then use SS 35 for determining the frequency offset. After the frame timing is found and frequency offset corrected, wireless device 110 may use CIS 40 to determine the cell ID. After the cell ID is determined, FIIS 45 indicates the frame number. The present disclosure contemplates various embodiments that may allow wireless device 110 to perform joint processing of the received signal without requiring the high receiver complexity associated with existing approaches. Both the cell ID as well as the frame number are therefore detected simultaneously without requiring any sequential detection process (and with only a moderate increase in complexity).

For example, in certain embodiments wireless device 110 receives a signal. Wireless device 110 collects a first set of sequences (e.g., CIS) corresponding to a first piece of information (e.g., cell ID) and a second set of sequences (e.g., FIIS) corresponding to a second piece of information (e.g., frame number) over multiple frames of the received signal. The first set of sequences may comprise a plurality of different versions of a first portion of the received signal corresponding to the first piece of information and the second set of sequences may comprise a plurality of different versions of a second portion of the received signal corresponding to the second piece of information. The second piece of information is encoded based at least in part on the first piece of information. In certain embodiments, the first and second pieces of information may be first and second pieces of cellular information (e.g., cell ID and frame number, respectively).

In some cases, wireless device 110 may store a first portion of the received signal in a first frame in a memory that collects the first set of sequences, and store a second portion of the received signal in a first frame in a memory that collects the second set of received sequences. Wireless device 110 may store a first portion of the received signal in a second frame in the memory that collects the first set of received sequences, and store a second portion of the received signal in a second frame in the memory that collects the second set of received sequences.

In certain embodiments, the first portion of the received signal in the first frame corresponds to a first version of the received sequence in the first set of sequences, and the second portion of the received signal in the first frame corresponds to a first version of the received sequence in the second set of sequences. The first portion of the received signal in the second frame corresponds to a second version of the received sequence in the first set of sequences, and the second portion of the received signal in the second frame corresponds to a second version of the received sequence in the second set of received sequences.

Wireless device 110 then processes the first set of sequences corresponding to the first piece of information to determine the first piece of information. Wireless device 110 may process the first set of sequences corresponding to the first piece of information to determine the first piece of information in any suitable manner. For example, in one example embodiment wireless device 110 may correlate a first version of the first portion of the received signal corresponding to the first piece of information with one or more sequences to produce an output. The first output may comprise a first set of correlation values. Wireless device 110 may correlate the second version of the first portion of the received signal corresponding to the first piece of information with one or more sequences to produce a second output. The second output may comprise a second set of correlation values. In some cases, wireless device 110 may accumulate a plurality of sets of correlation values to obtain a set of accumulated correlation values. For example, wireless device 110 may combine the first output and the second output to obtain a first set of accumulated correlation values. Wireless device 110 then determines the first piece of information based on the set of accumulated correlation values.

Wireless device 110 then processes, using the determined first piece of information, the second set of sequences corresponding to the second piece of information to determine the second piece of information simultaneously with the determination of the first piece of information. Wireless device 110 may process the second set of sequences corresponding to the second piece of information in any suitable manner. In one example embodiment, wireless device 110 first applies the first piece of information to the second set of sequences to remove the dependence on the first piece of information. For example, applying the first piece of information to the second set of sequences to remove the dependence on the first piece of information may comprise descrambling, using the first piece of information, the stored first and second versions of the second portion of the received signal corresponding to the second piece of information. After removing the dependence of the second value on the first value, wireless device 110 may process the first version and the second version of the second portion of the received signal corresponding to the second piece of information to recover the second piece of information.

In certain embodiments, to determine the second piece of information wireless device 110 correlates the descrambled first version of the second portion of the received signal corresponding to the second piece of information with a first set of sequences based on a first set of frame number hypotheses to obtain a first set of correlation values. Wireless device 110 correlates the descrambled second version of the second portion of the received signal corresponding to the second piece of information with a second set of sequences based on a second set of frame number hypotheses to obtain a second set of correlation values. Wireless device 110 accumulates the first set of correlation values and the second set of correlation values to generate a second set of accumulated correlation values. Wireless device 110 determines the second piece of information based at least in part on the generated set of accumulated correlation values.

Wireless device 110 may use any suitable sets of frame number hypotheses as the first and second sets of frame number hypotheses. For example, in some embodiments the first set of frame number hypotheses is {0, 1, . . . , K}, where K is an integer, and the second set of frame number hypotheses is {1, 2, . . . , (K+1) modulo N}, where N corresponds to the highest frame number allowed in the system.

As noted above, in particular embodiments the first piece of information is the cell identity information and the second piece of information is the time-varying frame number information. In such a scenario, the various embodiments described herein may advantageously mitigate some of the problems associated with the receiver signal processing for cell search in NB M2M systems. Compared to the existing design, the new design proposed herein achieves faster synchronization, improved receiver sensitivity for cell search, and/or has lower complexity.

Although certain example embodiments have been described in the context of cell synchronization, and in particular the determination of the cell ID and frame number, the present disclosure is not limited to such example embodiments. The various embodiments described herein are applicable to any suitable scenario where the problem is to detect two quantities of interest simultaneously, where the first quantity (or first piece of information) is separately encoded and the encoding of the second quantity (or second piece of information) is dependent on the first quantity. The example embodiments may be generalized as a method of recovering a first piece of information and a second piece of information. For example, the method may comprise collecting a first set of received sequences and a second set of received sequences in a received signal, each set of received sequences comprising a number of different versions of the received sequences. The method further comprises processing the first set of received signals to recover the first piece of information. The method further comprises utilizing the recovered first piece of information to jointly process the second set of received signals to recover the second piece of information. In some embodiments, the second set of received signals is processed prior to receiving a third set of signals.

Figure 3:
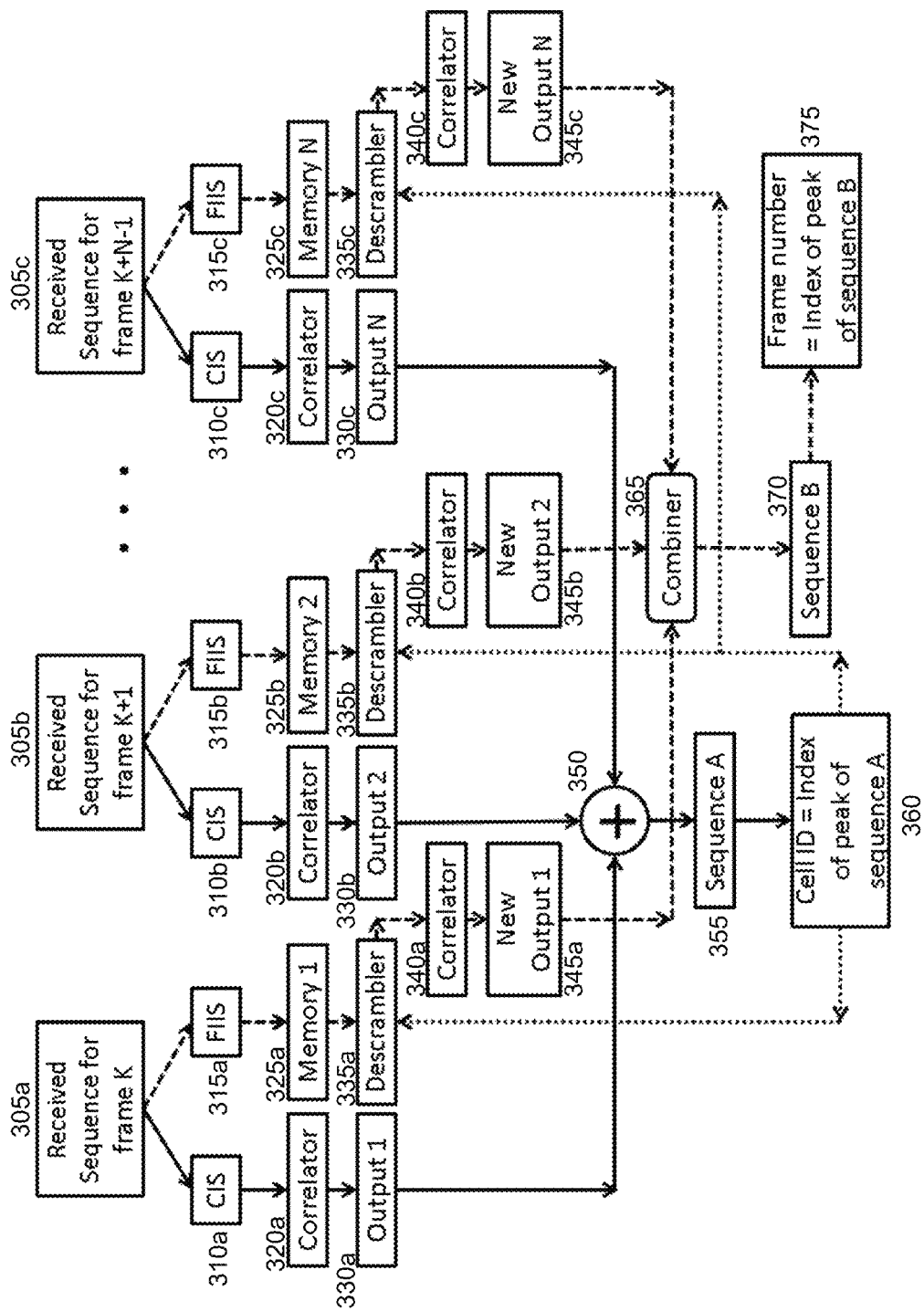
FIG. 3 is a flow diagram of a method in a receiver for time offset estimation, in accordance with certain embodiments.

FIG. 3 is a block diagram of a method in a receiver for joint processing of CIS and FIIS, in accordance with certain embodiments. The received sequences depicted in FIG. 3 corresponding to CIS 310a, 310b, 310c and FIIS 315a, 315b, 315c are first extracted from the received signal in each frame 305a, 305b, and 305c, respectively. This is possible after obtaining knowledge of frame timing and correction of frequency offset by using the SS, such as SS 35 described above in relation to FIG. 1. To achieve good performance in low SNR, a number of frames (305a, 305b, 305c) are received and processed. For each received frame the received sequence corresponding to the CIS is passed through a correlator 310, whereas the one corresponding to the FIIS is stored in memory 315. Thus, each of CIS 310a, 310b, and 310c are passed through correlators 320a, 320b, and 320c, respectively. In the example shown in FIG. 3, each of FIIS 315a, 315b, and 315c are stored in memory 1 325a, memory 2 325b, and memory N 325c, respectively.

The absolute values of the output of the correlator from the different frames are then combined to provide Sequence A 355. For example, output 1 330a from correlator 320a, output 2 330b from correlator 320b, and output N 330c from correlator 320c are combined at block 350 to generate Sequence A at block 355. Since there are 100 different CIS, the correlator output is a vector of length 100, and so is the length of sequence A. The index of the maximum value of Sequence A gives the cell ID at block 360. Once the cell ID is known, which typically happens when the maximum value of Sequence A is above a threshold, the cell specific scrambling sequence is also known, since it is directly related to the cell ID. The scrambling sequence is then used to descramble the stored FIIS received sequences in memory. This is done for the stored sequences in all the frames. For example, the cell specific scrambling sequence is used to descramble FIIS 315a stored in memory 325a at block 335a, FIIS 315b stored in memory 325b at block 335b, and FIIS 315c stored in memory N 325c at block 335c.

The output after descrambling in every frame is then passed through a correlator to give a new output. For example, the output after descrambling FIIS 315a at block 335a is passed through correlator 340a to give new output 1 at block 345a, the output after descrambling FIIS 315b at block 335b is passed through correlator 340a to give new output 2 at block 345b, and the output after descrambling FIIS 315c at block 335c is passed through correlator 340c to give new output N at block 345c. The obtained new output sequences at blocks 345a, 345b, and 345c are then combined in combiner 365 to generate Sequence B at block 370. The frame number at block 375 is given by the index of the maximum value of sequence B 370.

Note that the combining of the correlator outputs in the case of determination of cell ID corresponds to a simple addition, whereas for the frame number detection, the process is different. This is because the frame number changes in every frame by a value of 1. Therefore, the correlator outputs 345a, 345b, and 345c (i.e., the new output sequences) are first left cyclically shifted by 1, and then added to the previous new output sequence.

Figure 4:
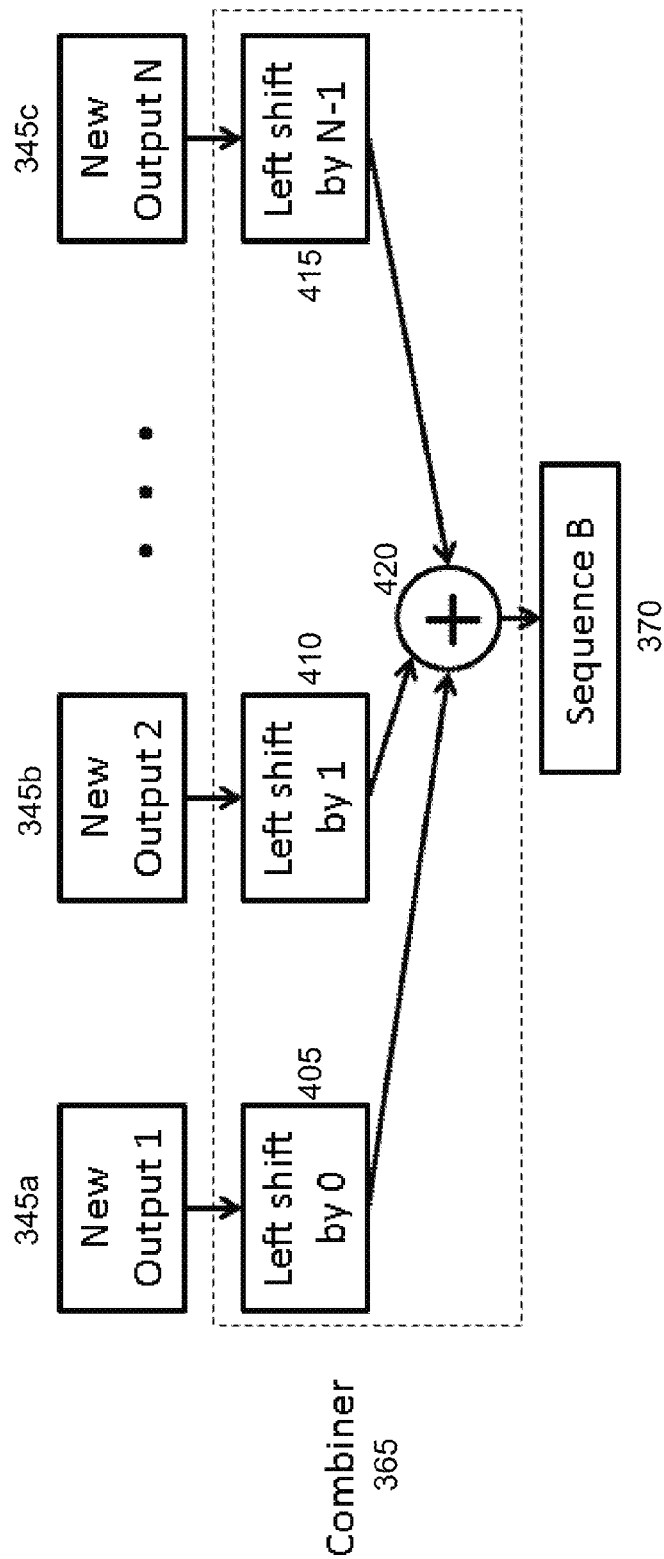
FIG. 4 illustrates a first example implementation of the combiner operation described in FIG. 3.

FIG. 4 illustrates a first implementation of the combiner operation described in FIG. 3, in accordance with certain embodiments. The combiner operation illustrated in FIG. 4 allows the frame number to be determined based on stored FIIS signals as soon as the cell ID is determined, without the need for reception of additional frames. Recall that the combining of the correlator outputs in the case of frame number detection is different than the determination of cell ID. The combining of the correlator outputs in the case of determination of cell ID corresponds to a simple addition. The frame number, however, changes in every frame by a value of 1. In the implementation of combiner 365 shown in FIG. 4, the correlator outputs 345a, 345b, and 345c (i.e., the new output sequences) are first left cyclically shifted by 1, and then added to the previous new output sequence. Correlator output 345a undergoes a left shift of 0, correlator output 345b undergoes a left shift of 1, and correlator output 345c undergoes a left shift of N−1. After the correlator outputs are left cyclically shifted by 1, they are added to the previous new output sequence at block 420 to generate Sequence B 370.

Figure 5:
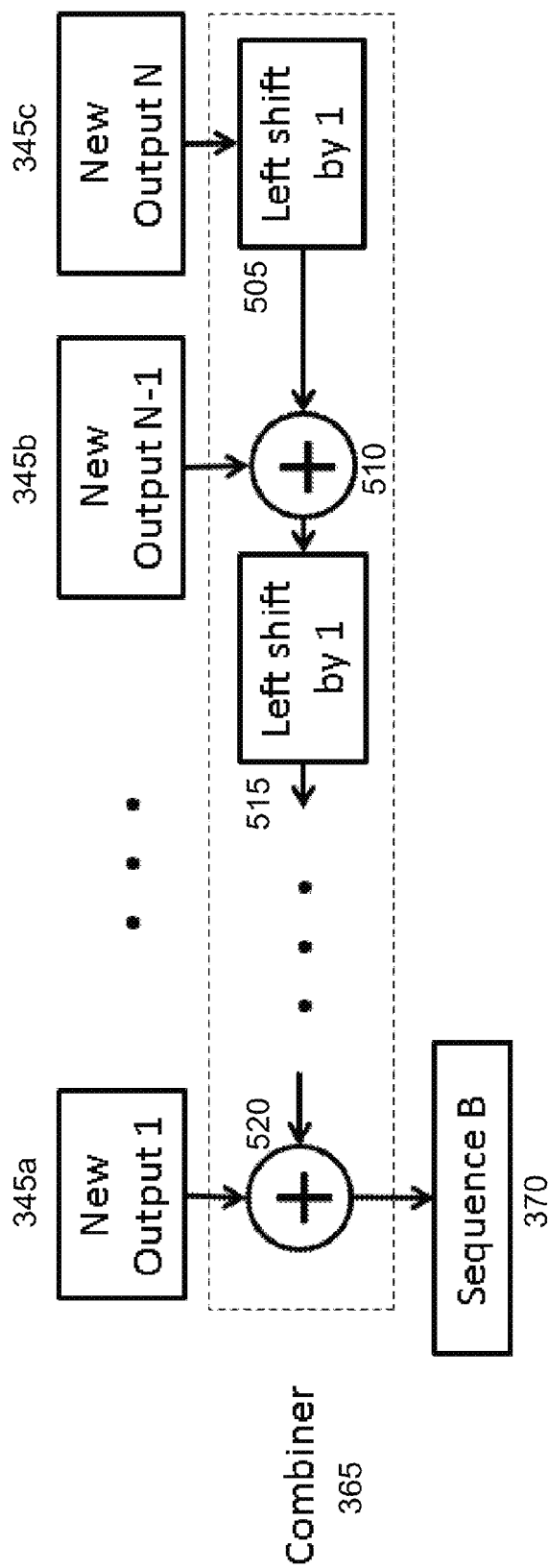
FIG. 5 illustrates a second example implementation of the combiner operation described in FIG. 3.

FIG. 5 illustrates a second implementation of the combiner operation described in FIG. 3, in accordance with certain embodiments. The combiner operation illustrated in FIG. 5 allows the frame number to be determined based on stored FIIS signals as soon as the cell ID is determined, without the need for reception of additional frames. In the implementation of combiner 365 shown in FIG. 5, each correlator 345a, 345b, and 345c (i.e., the new output sequences) are left cyclically shifted by 1, and then added to the previous new output sequence. As shown in FIG. 4, correlator output 345c undergoes a left shift of N−1, and then combined with correlator output 345b (i.e., new output N−1). The combination of correlator outputs 345c and 345b (new output N and new output N−1, respectively) undergo a left shift of 1 at block 515, and are then combined with correlator output 345a (new output 1) at block 520. and correlator output 345b undergoes a left shift of 1, and correlator output 345c undergoes a left shift of N−1. After the correlator outputs are left cyclically shifted by 1, they are added to the previous new output sequence at block 420 to generate Sequence B at block 370.

Figure 6:
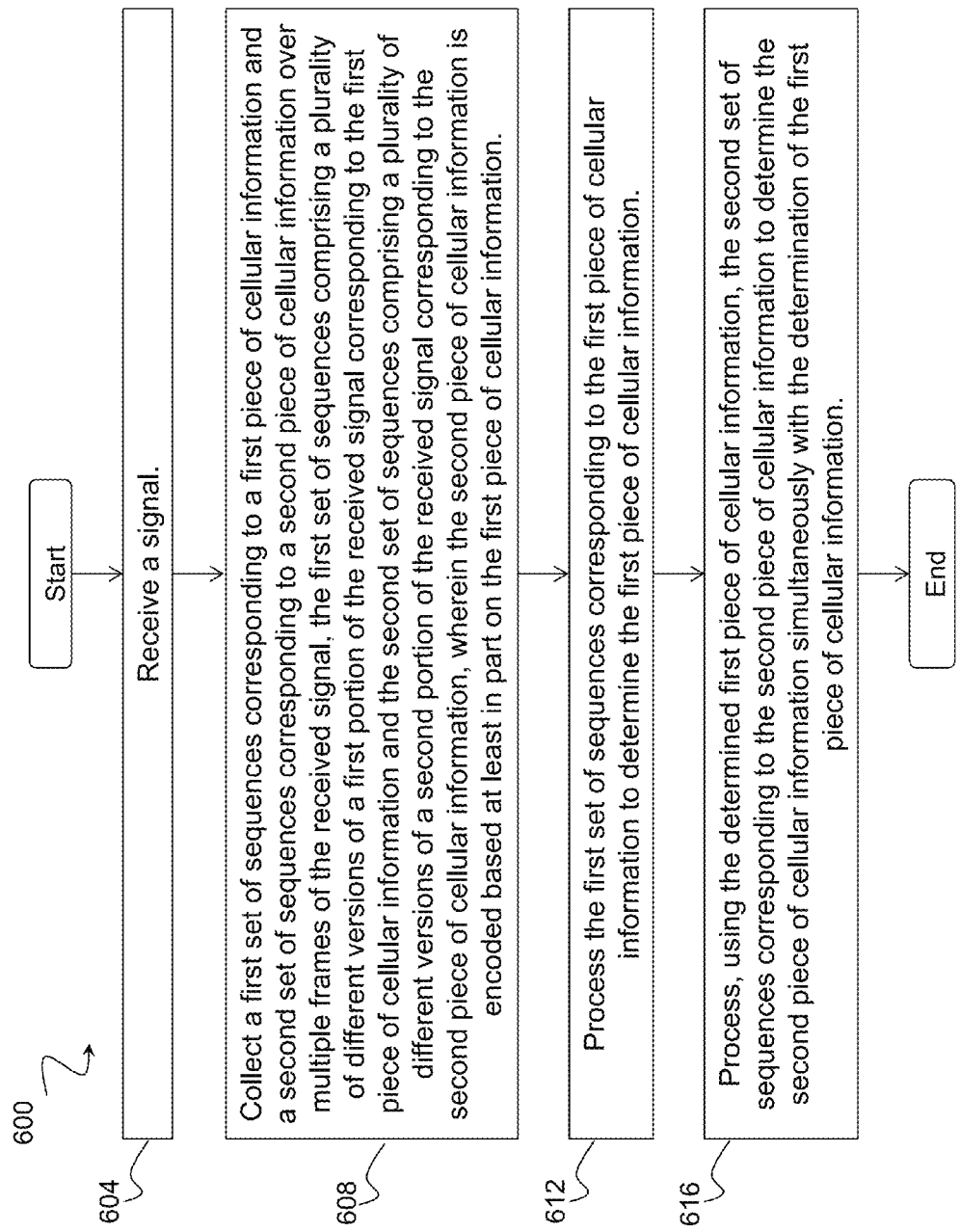
FIG. 6 is a flow diagram of a method in a node, in accordance with an embodiment.

FIG. 6 illustrates a method in a node. The method begins at step 604, where the node receives a signal. In certain embodiments, the node may comprise one of a wireless device and a network node. At step 608, the node collects a first set of sequences corresponding to a first piece of cellular information and a second set of sequences corresponding to a second piece of cellular information over multiple frames of the received signal. The first set of sequences comprises a plurality of different versions of a first portion of the received signal corresponding to the first piece of cellular information, and the second set of sequences comprises a plurality of different versions of a second portion of the received signal corresponding to the second piece of cellular information. The second piece of cellular information is encoded based at least in part on the first piece of cellular information. In certain embodiments, the first piece of cellular information may comprise cell identity information, and the second piece of cellular information may comprise frame number information.

In some cases, collecting the first set of sequences corresponding to the first piece of cellular information and the second set of sequences corresponding to the second piece of cellular information over multiple frames of the received signal may comprise: extracting, from a first frame of the received signal, a first version of the first portion of the received signal corresponding to the first piece of cellular information and a first version of the second portion of the received signal corresponding to the second piece of cellular information; and extracting, from a second frame of the received signal, a second version of the first portion of the received signal corresponding to the first piece of cellular information and a second version of the second portion of the received signal corresponding to the second piece of cellular information. In certain embodiments, the method may further comprise storing, in a memory, the first and second versions of the second portion of the received signal corresponding to the second piece of cellular information.

At step 612, the node processes the first set of sequences corresponding to the first piece of cellular information to determine the first piece of cellular information. In certain embodiments, processing the first set of sequences corresponding to the first piece of cellular information to determine the first piece of cellular information may comprise: correlating the first version of the first portion of the received signal corresponding to the first piece of cellular information with one or more sequences to produce a first output, the first output comprising a set of correlation values; correlating the second version of the first portion of the received signal corresponding to the first piece of cellular information with one or more sequences to produce a second output, the second output comprising a set of correlation values; combining the first output and the second output to obtain a first set of accumulated correlation values; and determining the first piece of cellular information based at least in part on the first set of accumulated correlation values.

At step 616, the node processes, using the determined first piece of cellular information, the second set of sequences corresponding to the second piece of cellular information to determine the second piece of cellular information simultaneously with the determination of the first piece of cellular information. In certain embodiments, processing, using the determined first piece of cellular information, the second set of sequences corresponding to the second piece of cellular information to determine the second piece of cellular information simultaneous with the determination of the first piece of cellular information may comprise: applying the first piece of cellular information to the stored first and second versions of the second portion of the received signal corresponding to the second piece of cellular information to generate modified first and second versions of the second portion of the received signal, wherein the modified first and second versions of the second portion of the received signal are no longer dependent on the first piece of cellular information; correlating the modified first version of the second portion of the received signal corresponding to the second piece of cellular information with a first set of sequences based on a first set of frame number hypotheses to obtain a first set of correlation values; correlating the modified second version of the second portion of the received signal corresponding to the second piece of cellular information with a second set of sequences based on a second set of frame number hypotheses to obtain a second set of correlation values; combining the first set of correlation values and the second set of correlation values to generate a second set of accumulated correlation values; and determining the second piece of cellular information based at least in part on the generated second set of accumulated correlation values.

In certain embodiments, the first set of frame number hypotheses may comprise $\{0, 1, \ldots, K\}$, where K is an integer; and the second set of frame number hypotheses may comprise $\{1, 2, \ldots, (K+1) \text{ modulo } N\}$, where N corresponds to a highest frame number allowed. In certain embodiments, applying the first piece of cellular information to the stored first and second versions of the second portion of the received signal to generate modified first and second versions of the second portion of the received signal may comprise descrambling (335a, 335b), using the first piece of cellular information, the stored first and second versions of the second portion of the received signal (315a, 315b) corresponding to the second piece of cellular information. In such a case, the modified first version of the second portion of the received signal may comprise a descrambled first version of the second portion of the received signal; and the modified second version of the second portion of the received signal may comprise a descrambled second version of the second portion of the received signal.

Figure 7:
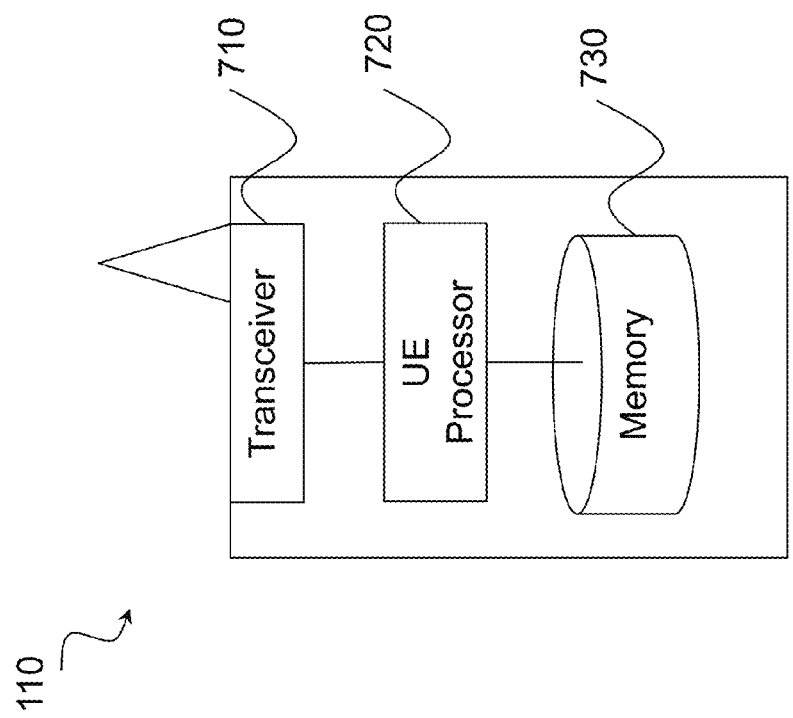
FIG. 7 is a schematic diagram of an exemplary wireless device, in accordance with certain embodiments.

FIG. 7 is a block schematic of an exemplary wireless device 110, in accordance with certain embodiments. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, a modem, a machine-type-communication (MTC) device/machine-to-machine (M2M) device, laptop embedded equipment (LEE), laptop mounted equipment (LME), USB dongles, a D2D capable device, or another device that can provide wireless communication. A wireless device 110 may also be referred to as UE, a station (STA), a device, or a terminal in some embodiments. Wireless device 110 includes transceiver 710, processor 720, and memory 730. In some embodiments, transceiver 710 facilitates transmitting wireless signals to and receiving wireless signals from network node 115 (e.g., via an antenna), processor 720 executes instructions to provide some or all of the functionality described above as being provided by wireless device 110, and memory 730 stores the instructions executed by processor 720.

Processor 720 may include any suitable combination of hardware and software implemented in one or more modules to execute instructions and manipulate data to perform some or all of the described functions of wireless device 110, such as the functions of wireless device 110 described above in relation to FIGS. 1-6. In some embodiments, processor 720 may include, for example, one or more computers, one or more central processing units (CPUs), one or more microprocessors, one or more applications, one or more application specific integrated circuits (ASICs), one or more field programmable gate arrays (FPGAs) and/or other logic.

Memory 730 is generally operable to store instructions, such as a computer program, software, an application including one or more of logic, rules, algorithms, code, tables, etc. and/or other instructions capable of being executed by a processor. Examples of memory 730 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by processor 720.

Other embodiments of wireless device 110 may include additional components beyond those shown in FIG. 7 that may be responsible for providing certain aspects of the wireless device's functionality, including any of the functionality described above and/or any additional functionality (including any functionality necessary to support the solution described above). As just one example, wireless device 110 may include input devices and circuits, output devices, and one or more synchronization units or circuits, which may be part of the processor 720. Input devices include mechanisms for entry of data into wireless device 110. For example, input devices may include input mechanisms, such as a microphone, input elements, a display, etc. Output devices may include mechanisms for outputting data in audio, video and/or hard copy format. For example, output devices may include a speaker, a display, etc.

Figure 8:
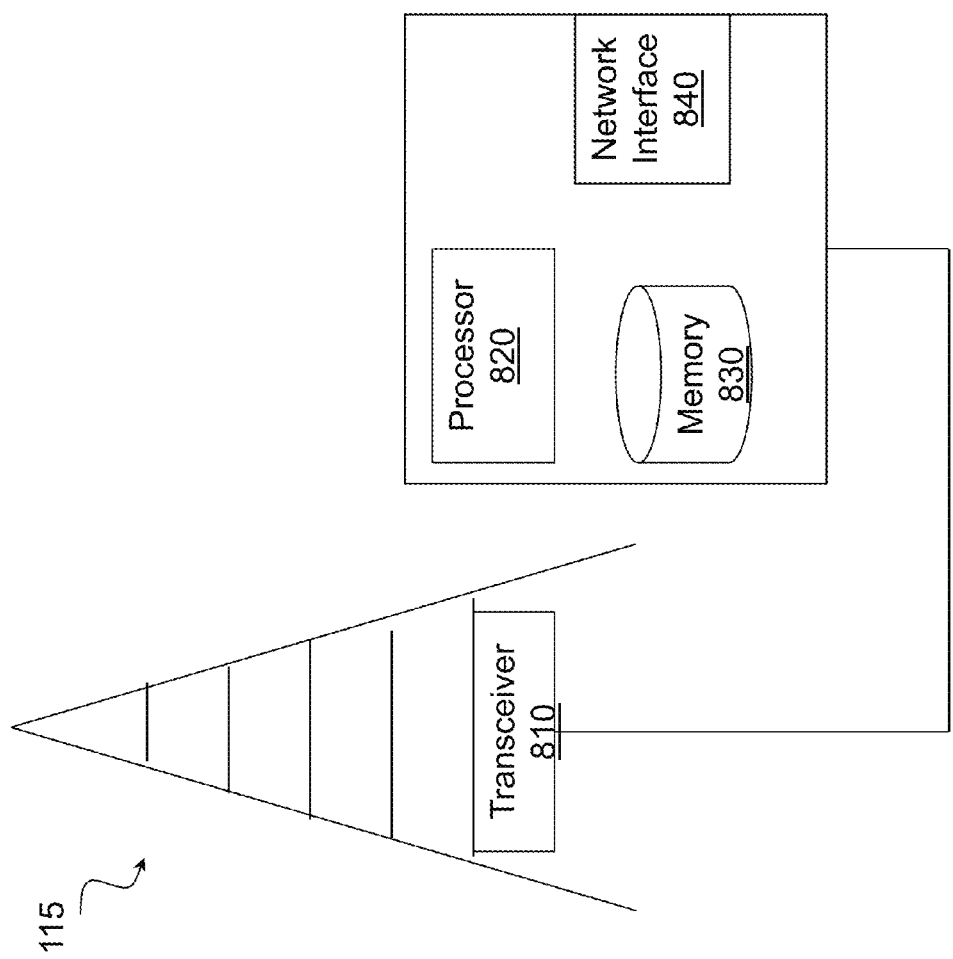
FIG. 8 is a schematic diagram of an exemplary network node, in accordance with certain embodiments.

FIG. 8 is a block schematic of an exemplary network node 115, in accordance with certain embodiments. Network node 115 may be any type of radio network node or any network node that communicates with a UE and/or with another network node. Examples of network node 115 include an eNodeB, a node B, a base station, a wireless access point (e.g., a Wi-Fi access point), a low power node, a base transceiver station (BTS), relay, donor node controlling relay, transmission points, transmission nodes, remote RF unit (RRU), remote radio head (RRH), multi-standard radio (MSR) radio node such as MSR BS, nodes in distributed antenna system (DAS), O&M, OSS, SON, positioning node (e.g., E-SMLC), MDT, or any other suitable network node. Network nodes 115 may be deployed throughout network 100 as a homogenous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 810, processor 820, memory 830, and network interface 840. In some embodiments, transceiver 810 facilitates transmitting wireless signals to and receiving wireless signals from wireless device 110 (e.g., via an antenna), processor 820 executes instructions to provide some or all of the functionality described above as being provided by a network node 115, memory 830 stores the instructions executed by processor 820, and network interface 840 communicates signals to backend network components, such as a gateway, switch, router, Internet, Public Switched Telephone Network (PSTN), core network nodes or radio network controllers 130, etc.

Processor 820 may include any suitable combination of hardware and software implemented in one or more modules to execute instructions and manipulate data to perform some or all of the described functions of network node 115, such as those described above in relation to FIGS. 1-6 above. In some embodiments, processor 820 may include, for example, one or more computers, one or more central processing units (CPUs), one or more microprocessors, one or more applications, and/or other logic.

Memory 830 is generally operable to store instructions, such as a computer program, software, an application including one or more of logic, rules, algorithms, code, tables, etc. and/or other instructions capable of being executed by a processor. Examples of memory 830 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 840 is communicatively coupled to processor 820 and may refer to any suitable device operable to receive input for network node 115, send output from network node 115, perform suitable processing of the input or output or both, communicate to other devices, or any combination of the preceding. Network interface 840 may include appropriate hardware (e.g., port, modem, network interface card, etc.) and software, including protocol conversion and data processing capabilities, to communicate through a network.

Other embodiments of network node 115 may include additional components beyond those shown in FIG. 8 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 9:
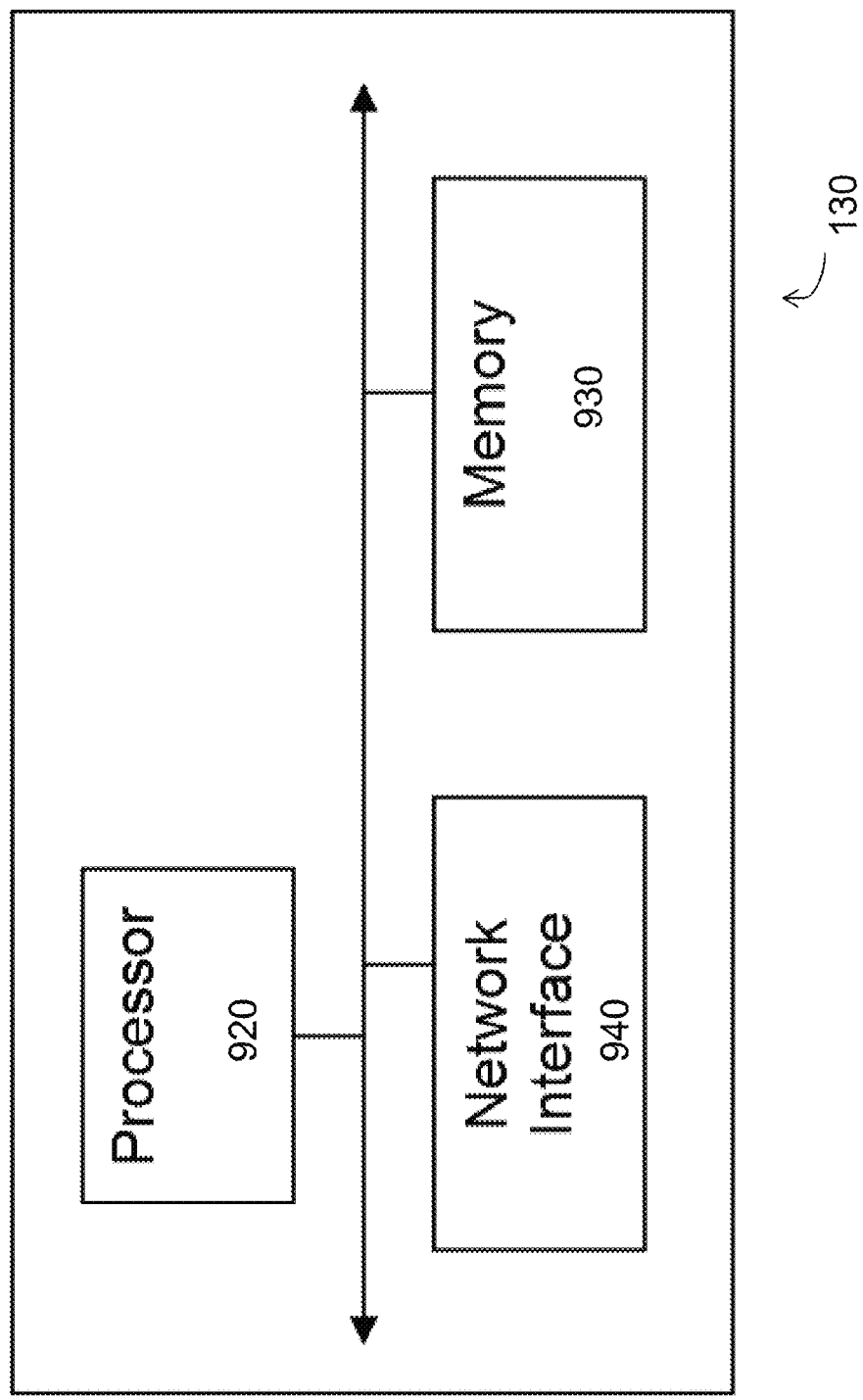
FIG. 9 is a schematic diagram of an exemplary radio network controller or core network node, in accordance with certain embodiments.

FIG. 9 is a block schematic of an exemplary radio network controller or core network node 130, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 130 includes processor 920, memory 930, and network interface 940. In some embodiments, processor 920 executes instructions to provide some or all of the functionality described above as being provided by the network node, memory 930 stores the instructions executed by processor 920, and network interface 940 communicates signals to any suitable node, such as a gateway, switch, router, Internet, Public Switched Telephone Network (PSTN), network nodes 115, radio network controllers or core network nodes 130, etc.

Processor 920 may include any suitable combination of hardware and software implemented in one or more modules to execute instructions and manipulate data to perform some or all of the described functions of the radio network controller or core network node 130. In some embodiments, processor 920 may include, for example, one or more computers, one or more central processing units (CPUs), one or more microprocessors, one or more applications, and/or other logic.

Memory 930 is generally operable to store instructions, such as a computer program, software, an application including one or more of logic, rules, algorithms, code, tables, etc. and/or other instructions capable of being executed by a processor. Examples of memory 930 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 940 is communicatively coupled to processor 920 and may refer to any suitable device operable to receive input for the network node, send output from the network node, perform suitable processing of the input or output or both, communicate to other devices, or any combination of the preceding. Network interface 940 may include appropriate hardware (e.g., port, modem, network interface card, etc.) and software, including protocol conversion and data processing capabilities, to communicate through a network.

Other embodiments of the network node may include additional components beyond those shown in FIG. 9 that may be responsible for providing certain aspects of the network node's functionality, including any of the functionality described above and/or any additional functionality (including any functionality necessary to support the solution described above).

Figure 10:
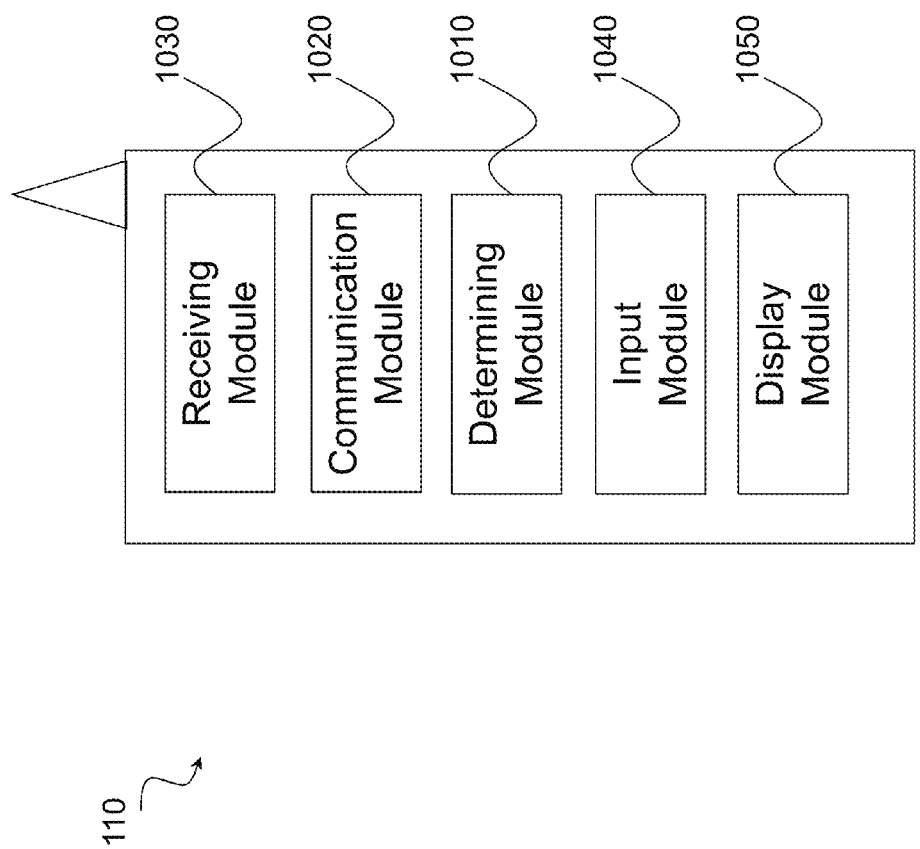
FIG. 10 is a schematic diagram of an exemplary wireless device, in accordance with certain embodiments.

FIG. 10 is a schematic block diagram of an exemplary wireless device, in accordance with certain embodiments. Wireless device 110 may include one or more modules. For example, wireless device 110 may include a determining module 1010, a communication module 1020, a receiver module 1030, an input module 1040, a display module 1050, and any other suitable modules.

Determining module 1010 may perform the processing functions of wireless device 110. For example, determining module 1010 may collect a first set of sequences corresponding to a first piece of cellular information and a second set of sequences corresponding to a second piece of cellular information over multiple frames of a received signal. As another example, determining module 1010 may process the first set of sequences corresponding to the first piece of cellular information to determine the first piece of cellular information. As still another example, determining module 1010 may process, using the determined first piece of cellular information, the second set of sequences corresponding to the second piece of cellular information to determine the second piece of cellular information simultaneously with the determination of the first piece of cellular information. Determining module 1010 may include or be included in one or more processors, such as processor 720 described above in relation to FIG. 7. Determining module 1010 may include analog and/or digital circuitry configured to perform any of the functions of determining module 1010 and/or processor 720 described above. The functions of determining module 1010 described above may, in certain embodiments, be performed in one or more distinct modules.

Communication module 1020 may perform the transmission functions of wireless device 110. Communication module 1020 may transmit messages to one or more of network nodes 115 of network 100. Communication module 1020 may include a transmitter and/or a transceiver, such as transceiver 710 described above in relation to FIG. 7. Communication module 1020 may include circuitry configured to wirelessly transmit messages and/or signals. In particular embodiments, communication module 1020 may receive messages and/or signals for transmission from determining module 1010.

Receiving module 1030 may perform the receiving functions of wireless device 110. For example, receiving module 1030 may receive a signal. Receiving module 1030 may include a receiver and/or a transceiver. Receiving module 1030 may include circuitry configured to wirelessly receive messages and/or signals. In particular embodiments, receiving module 1030 may communicate received messages and/or signals to determining module 1010.

Input module 1040 may receive user input intended for wireless device 110. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to determining module 1010.

Display module 1050 may present signals on a display of wireless device 110. Display module 1050 may include the display and/or any appropriate circuitry and hardware configured to present signals on the display. Display module 1050 may receive signals to present on the display from determining module 1010.

Determining module 1010, communication module 1020, receiving module 1030, input module 1040, and display module 1050 may include any suitable configuration of hardware and/or software. Wireless device 110 may include additional modules beyond those shown in FIG. 10 that may be responsible for providing any suitable functionality, including any of the functionality described above and/or any additional functionality (including any functionality necessary to support the various solutions described herein).

Figure 11:
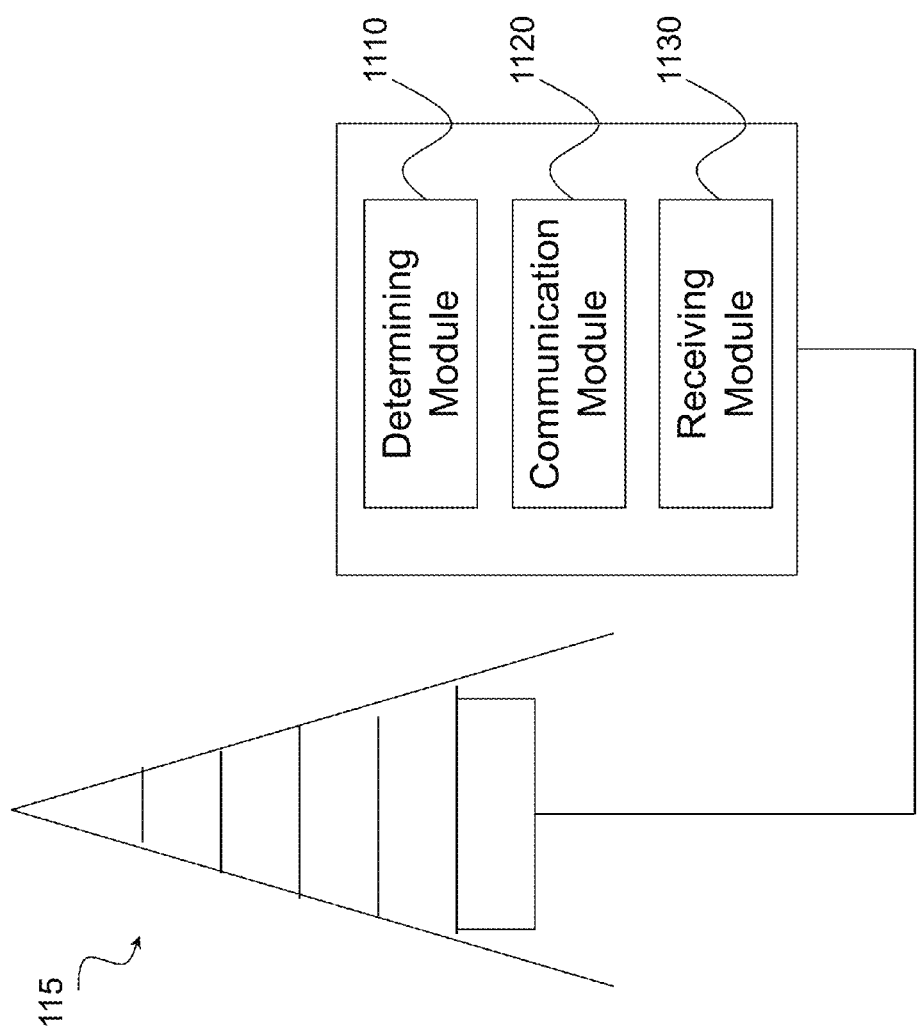
FIG. 11 is a schematic diagram of an exemplary network node, in accordance with certain embodiments.

FIG. 11 is a schematic block diagram of an exemplary network node 115, in accordance with certain embodiments. Network node 115 may include one or more modules. For example, network node 115 may include determining module 1110, communication module 1120, receiving module 1130, and any other suitable modules. In some embodiments, one or more of determining module 1110, communication module 1120, receiving module 1130, or any other suitable module may be implemented using one or more processors, such as processor 820 described above in relation to FIG. 8. In certain embodiments, the functions of two or more of the various modules may be combined into a single module.

Determining module 1110 may perform the processing functions of network node 115. As one example, determining module 1110 may collect a first set of sequences corresponding to a first piece of cellular information and a second set of sequences corresponding to a second piece of cellular information over multiple frames of a received signal. As another example, determining module 1110 may process the first set of sequences corresponding to the first piece of cellular information to determine the first piece of cellular information. As still another example, determining module 1110 may process, using the determined first piece of cellular information, the second set of sequences corresponding to the second piece of cellular information to determine the second piece of cellular information simultaneously with the determination of the first piece of cellular information. Determining module 1110 may include or be included in one or more processors, such as processor 820 described above in relation to FIG. 8. Determining module 1110 may include analog and/or digital circuitry configured to perform any of the functions of determining module 1110 and/or processor 820 described above. The functions of determining module 1110 may, in certain embodiments, be performed in one or more distinct modules.

Communication module 1120 may perform the transmission functions of network node 115. As one example, communication module 1120 may receive a signal. Communication module 1120 may transmit messages to one or more of wireless devices 110. Communication module 1120 may include a transmitter and/or a transceiver, such as transceiver 810 described above in relation to FIG. 8. Communication module 1120 may include circuitry configured to wirelessly transmit messages and/or signals. In particular embodiments, communication module 1120 may receive messages and/or signals for transmission from determining module 1110 or any other module.

Receiving module 1130 may perform the receiving functions of network node 115. Receiving module 1130 may receive any suitable information from a wireless device. Receiving module 1130 may include a receiver and/or a transceiver. Receiving module 1130 may include circuitry configured to wirelessly receive messages and/or signals. In particular embodiments, receiving module 1130 may communicate received messages and/or signals to determining module 1110 or any other suitable module.

Determining module 1110, communication module 1120, and receiving module 1130 may include any suitable configuration of hardware and/or software. Network node 115 may include additional modules beyond those shown in FIG. 11 that may be responsible for providing any suitable functionality, including any of the functionality described above and/or any additional functionality (including any functionality necessary to support the various solutions described herein).

Figure 12:
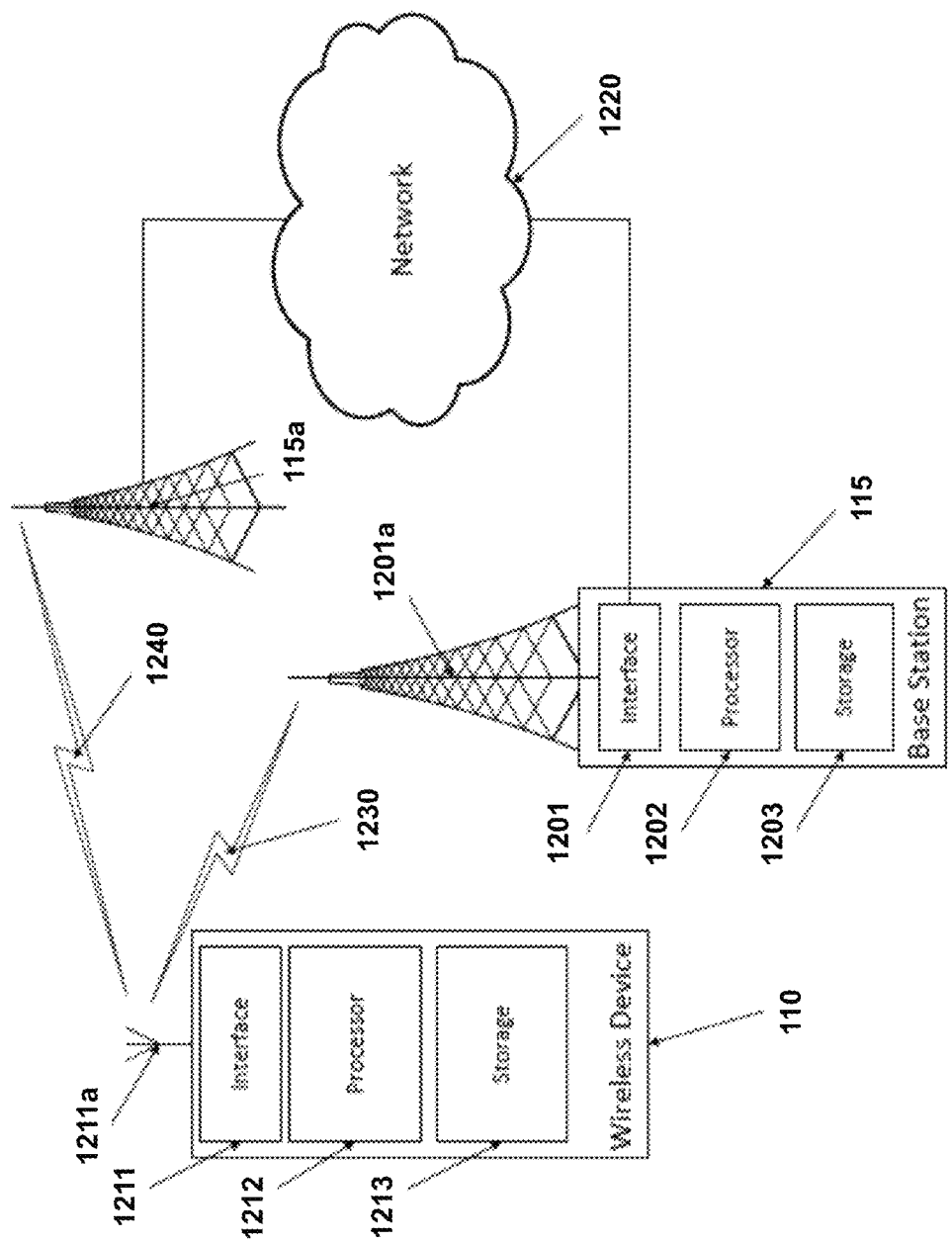
FIG. 12 is a block diagram illustrating an embodiment of a wireless communication network, in accordance with certain embodiments.

FIG. 12 is a block diagram illustrating an embodiment of a wireless communication network, in accordance with certain embodiments. More particularly, FIG. 12 illustrates a more detailed view of network node 115 and wireless device 110. For simplicity, FIG. 12 depicts network 1220, network nodes 115 and 115a, and wireless device 110. Network node 115 comprises processor 1202, storage 1203, interface 1201, and antenna 1201a. Similarly, wireless device 110 comprises processor 1212, storage 1213, interface 1211 and antenna 1211a. These components may work together in order to provide network node and/or wireless device functionality, such as providing wireless connections in a wireless network and detecting cell identity and frame number information. For example, wireless device 110 (including processor 1212, storage 1213, interface 1211, and antenna 1211a) and network nodes 115 and/or 115a (including processor 1202, storage 1203, interface 1201, and antenna 1201a) may perform some or all of the described functions of wireless device 110 and network node 115 described above in relation to FIGS. 1-6. In different embodiments, the wireless network may comprise any number of wired or wireless networks, network nodes, base stations, controllers, wireless devices, relay stations, and/or any other components that may facilitate or participate in the communication of data and/or signals whether via wired or wireless connections.

Network 1220 may comprise one or more IP networks, public switched telephone networks (PSTNs), packet data networks, optical networks, wide area networks (WANs), local area networks (LANs), wireless local area networks (WLANs), wired networks, wireless networks, metropolitan area networks, and other networks to enable communication between devices.

Network node 115 comprises processor 1202, storage 1203, interface 1201, and antenna 1201a. These components are depicted as single boxes located within a single larger box. In practice however, network node 115 may comprises multiple different physical components that make up a single illustrated component (e.g., interface 1201 may comprise terminals for coupling wires for a wired connection and a radio transceiver for a wireless connection). Similarly, network node 115 may be composed of multiple physically separate components (e.g., a NodeB component and a RNC component, a BTS component and a BSC component, etc.), which may each have their own respective processor, storage, and interface components. In certain scenarios in which network node 115 comprises multiple separate components (e.g., BTS and BSC components), one or more of the separate components may be shared among several network nodes. For example, a single RNC may control multiple NodeB's. In such a scenario, each unique NodeB and BSC pair, may be a separate network node. In some embodiments, network node 115 may be configured to support multiple radio access technologies (RATs). In such embodiments, some components may be duplicated (e.g., separate storage 203 for the different RATs) and some components may be reused (e.g., the same antenna 1201a may be shared by the RATs).

Processor 1202 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other network node 115 components, such as storage 1203, network node 115 functionality. For example, processor 1202 may execute instructions stored in storage 1203. Such functionality may include providing various wireless features discussed herein to a wireless devices, such as wireless device 110, including any of the features or benefits disclosed herein.

Storage 1203 may comprise any form of volatile or non-volatile computer readable memory including, without limitation, persistent storage, solid state memory, remotely mounted memory, magnetic media, optical media, random access memory (RAM), read-only memory (ROM), removable media, or any other suitable local or remote memory component. Storage 1203 may store any suitable instructions, data or information, including software and encoded logic, utilized by network node 115. Storage 1203 may be used to store any calculations made by processor 1202 and/or any data received via interface 1201.

Network node 115 also comprises interface 1201 which may be used in the wired or wireless communication of signaling and/or data between network node 115, network 1220, and/or wireless device 1210. For example, interface 1201 may perform any formatting, coding, or translating that may be needed to allow network node 115 to send and receive data from network 1220 over a wired connection. Interface 1201 may also include a radio transmitter and/or receiver that may be coupled to or a part of antenna 1201a. The radio may receive digital data that is to be sent out to other network nodes or wireless devices via a wireless connection. The radio may convert the digital data into a radio signal having the appropriate channel and bandwidth parameters. The radio signal may then be transmitted via antenna 1201a to the appropriate recipient (e.g., wireless device 110).

Antenna 1201a may be any type of antenna capable of transmitting and receiving data and/or signals wirelessly. In some embodiments, antenna 1201a may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

Wireless device 110 may be any type of wireless endpoint, mobile station, mobile phone, wireless local loop phone, smartphone, user equipment, desktop computer, PDA, cell phone, tablet, laptop, VoIP phone or handset, which is able to wirelessly send and receive data and/or signals to and from a network node, such as network node 115 and/or other wireless devices. Wireless device 110 comprises processor 1212, storage 1213, interface 1211, and antenna 1211a. Like network node 115, the components of wireless device 110 are depicted as single boxes located within a single larger box, however in practice a wireless device may comprises multiple different physical components that make up a single illustrated component (e.g., storage 1213 may comprise multiple discrete microchips, each microchip representing a portion of the total storage capacity).

Processor 1212 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in combination with other wireless device 110 components, such as storage 1213, wireless device 110 functionality. Such functionality may include providing various wireless features discussed herein, including any of the features or benefits disclosed herein.

Storage 1213 may be any form of volatile or non-volatile memory including, without limitation, persistent storage, solid state memory, remotely mounted memory, magnetic media, optical media, random access memory (RAM), read-only memory (ROM), removable media, or any other suitable local or remote memory component. Storage 1213 may store any suitable data, instructions, or information, including software and encoded logic, utilized by wireless device 110. Storage 1213 may be used to store any calculations made by processor 1212 and/or any data received via interface 1211.

Interface 1211 may be used in the wireless communication of signaling and/or data between wireless device 110 and network node 115. For example, interface 1211 may perform any formatting, coding, or translating that may be needed to allow wireless device 110 to send and receive data from network node 115 over a wireless connection. Interface 1211 may also include a radio transmitter and/or receiver that may be coupled to or a part of antenna 1211a. The radio may receive digital data that is to be sent out to network node 115 via a wireless connection. The radio may convert the digital data into a radio signal having the appropriate channel and bandwidth parameters. The radio signal may then be transmitted via antenna 1211a to network node 115.

Antenna 1211a may be any type of antenna capable of transmitting and receiving data and/or signals wirelessly. In some embodiments, antenna 1211a may comprise one or more omni-directional, sector or panel antennas operable to transmit/receive radio signals between 2 GHz and 66 GHz. For simplicity, antenna 1211a may be considered a part of interface 1211 to the extent that a wireless signal is being used.

In some embodiments, the components described above may be used to implement one or more functional modules used in detecting cell identity and frame number information. The functional modules may comprise software, computer programs, sub-routines, libraries, source code, or any other form of executable instructions that are run by, for example, a processor. In general terms, each functional module may be implemented in hardware and/or in software. Preferably, one or more or all functional modules may be implemented by processors 1212 and/or 1202, possibly in cooperation with storage 1213 and/or 1203. Processors 1212 and/or 1202 and storage 1213 and/or 1203 may thus be arranged to allow processors 1212 and/or 1202 to fetch instructions from storage 1213 and/or 1203 and execute the fetched instructions to allow the respective functional module to perform any features or functions disclosed herein. The modules may further be configured to perform other functions or steps not explicitly described herein but which would be within the knowledge of a person skilled in the art.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art.

Accordingly, the above description of the embodiments does not constrain this disclosure. Other changes, substitutions, and alterations are possible without departing from the spirit and scope of this disclosure, as defined by the following claims.

Abbreviations used in the preceding description include:
PSS Primary Synchronization Sequence
SSS Secondary Synchronization Sequence
SS Synchronization Sequence
CIS Cell ID Sequence
FIIS Frame Index Indication Sequence
BIB Broadcast Information Block
NB M2M Narrowband Machine to Machine
GSM Global System for Mobile Communications
EDGE Enhanced Data Rates for GSM Evolution
GERAN GSM EDGE Radio Access Network
MHz Mega Hertz
Hz Hertz
kHz Kilo Hertz
TU Typical Urban
MTC Machine Type Communications
3GPP Third Generation Partnership Project
PBSCH Physical Broadcast Synchronization Channel
FDM Frequency Division Multiplexing

The invention claimed is:

1. A method in a node, comprising:
receiving a signal;
collecting a first set of sequences corresponding to a first piece of cellular information and a second set of sequences corresponding to a second piece of cellular information over multiple frames of the received signal, the first set of sequences comprising a plurality of different versions of a first portion of the received signal corresponding to the first piece of cellular information and the second set of sequences comprising a plurality of different versions of a second portion of the received signal corresponding to the second piece of cellular information, wherein the second piece of cellular information is encoded based at least in part on the first piece of cellular information;
processing the first set of sequences corresponding to the first piece of cellular information to determine the first piece of cellular information;
processing, using the determined first piece of cellular information, the second set of sequences corresponding to the second piece of cellular information to determine the second piece of cellular information simultaneously with the determination of the first piece of cellular information.

2. The method of claim 1, wherein the node comprises one of a wireless device and a network node.

3. The method of claim 1, wherein collecting the first set of sequences corresponding to the first piece of cellular information and the second set of sequences corresponding to the second piece of cellular information over multiple frames of the received signal comprises:
extracting, from a first frame of the received signal, a first version of the first portion of the received signal corresponding to the first piece of cellular information and a first version of the second portion of the received signal corresponding to the second piece of cellular information; and
extracting, from a second frame of the received signal, a second version of the first portion of the received signal corresponding to the first piece of cellular information and a second version of the second portion of the received signal corresponding to the second piece of cellular information.

4. The method of claim 3, further comprising storing, in a memory, the first and second versions of the second portion of the received signal corresponding to the second piece of cellular information.

5. The method of claim 3, wherein processing the first set of sequences corresponding to the first piece of cellular information to determine the first piece of cellular information comprises:
correlating the first version of the first portion of the received signal corresponding to the first piece of cellular information with one or more sequences to produce a first output, the first output comprising a set of correlation values;
correlating the second version of the first portion of the received signal corresponding to the first piece of cellular information with one or more sequences to produce a second output, the second output comprising a set of correlation values;
combining the first output and the second output to obtain a first set of accumulated correlation values; and
determining the first piece of cellular information based at least in part on the first set of accumulated correlation values.

6. The method of claim 3, wherein processing, using the determined first piece of cellular information, the second set of sequences corresponding to the second piece of cellular information to determine the second piece of cellular information simultaneous with the determination of the first piece of cellular information comprises:
applying the first piece of cellular information to the stored first and second versions of the second portion of the received signal corresponding to the second piece of cellular information to generate modified first and second versions of the second portion of the received signal, wherein the modified first and second versions of the second portion of the received signal are no longer dependent on the first piece of cellular information;
correlating the modified first version of the second portion of the received signal corresponding to the second piece of cellular information with a first set of sequences based on a first set of frame number hypotheses to obtain a first set of correlation values;
correlating the modified second version of the second portion of the received signal corresponding to the second piece of cellular information with a second set of sequences based on a second set of frame number hypotheses to obtain a second set of correlation values;
combining the first set of correlation values and the second set of correlation values to generate a second set of accumulated correlation values; and
determining the second piece of cellular information based at least in part on the generated second set of accumulated correlation values.

7. The method of claim 6, wherein:
the first set of frame number hypotheses comprises {0, 1, . . . , K}, where K is an integer; and
the second set of frame number hypotheses comprises {1, 2, . . . , (K+1) modulo N}, where N corresponds to a highest frame number allowed.

8. The method of claim 6, wherein applying the first piece of cellular information to the stored first and second versions of the second portion of the received signal to generate modified first and second versions of the second portion of the received signal comprises:
  descrambling, using the first piece of cellular information, the stored first and second versions of the second portion of the received signal corresponding to the second piece of cellular information, wherein:
  the modified first version of the second portion of the received signal comprises a descrambled first version of the second portion of the received signal; and
  the modified second version of the second portion of the received signal comprises a descrambled second version of the second portion of the received signal.

9. The method of claim 1, wherein the first piece of cellular information comprises cell identity information.

10. The method of claim 1, wherein the second piece of cellular information comprises frame number information.

11. A node comprising:
  one or more processors, the one or more processors configured to:
  receive a signal;
  collect a first set of sequences corresponding to a first piece of cellular information and a second set of sequences corresponding to a second piece of cellular information over multiple frames of the received signal, the first set of sequences comprising a plurality of different versions of a first portion of the received signal corresponding to the first piece of cellular information and the second set of sequences comprising a plurality of different versions of a second portion of the received signal corresponding to the second piece of cellular information, wherein the second piece of cellular information is encoded based at least in part on the first piece of cellular information;
  process the first set of sequences corresponding to the first piece of cellular information to determine the first piece of cellular information;
  process, using the determined first piece of cellular information, the second set of sequences corresponding to the second piece of cellular information to determine the second piece of cellular information simultaneously with the determination of the first piece of cellular information.

12. The node of claim 11, wherein the node comprises one of a wireless device and a network node.

13. The node of claim 11, wherein the one or more processors are further configured to:
  extract, from a first frame of the received signal, a first version of the first portion of the received signal corresponding to the first piece of cellular information and a first version of the second portion of the received signal corresponding to the second piece of cellular information; and
  extract, from a second frame of the received signal, a second version of the first portion of the received signal corresponding to the first piece of cellular information and a second version of the second portion of the received signal corresponding to the second piece of cellular information.

14. The node of claim 13, wherein the one or more processors are further configured to store, in a memory, the first and second versions of the second portion of the received signal corresponding to the second piece of cellular information.

15. The node of claim 13, wherein the one or more processors are further configured to:
  correlate the first version of the first portion of the received signal corresponding to the first piece of cellular information with one or more sequences to produce a first output, the first output comprising a set of correlation values;
  correlate the second version of the first portion of the received signal corresponding to the first piece of cellular information with one or more sequences to produce a second output, the second output comprising a set of correlation values;
  combine the first output and the second output to obtain a first set of accumulated correlation values; and
  determining the first piece of cellular information based at least in part on the first set of accumulated correlation values.

16. The node of claim 13, wherein the one or more processors are further configured to:
  apply the first piece of cellular information to the stored first and second versions of the second portion of the received signal corresponding to the second piece of cellular information to generate modified first and second versions of the second portion of the received signal, wherein the modified first and second versions of the second portion of the received signal are no longer dependent on the first piece of cellular information;
  correlate the modified first version of the second portion of the received signal corresponding to the second piece of cellular information with a first set of sequences based on a first set of frame number hypotheses to obtain a first set of correlation values;
  correlate the modified second version of the second portion of the received signal corresponding to the second piece of cellular information with a second set of sequences based on a second set of frame number hypotheses to obtain a second set of correlation values;
  combine the first set of correlation values and the second set of correlation values to generate a second set of accumulated correlation values; and
  determine the second piece of cellular information based at least in part on the generated second set of accumulated correlation values.

17. The node of claim 16, wherein:
  the first set of frame number hypotheses comprises $\{0, 1, \ldots, K\}$, where K is an integer; and
  the second set of frame number hypotheses comprises $\{1, 2, \ldots, (K+1) \bmod N\}$, where N corresponds to a highest frame number allowed.

18. The node of claim 16, wherein the one or more processors are further configured to:
  descramble, using the first piece of cellular information, the stored first and second versions of the second portion of the received signal corresponding to the second piece of cellular information, wherein:
  the modified first version of the second portion of the received signal comprises a descrambled first version of the second portion of the received signal; and
  the modified second version of the second portion of the received signal comprises a descrambled second version of the second portion of the received signal.

19. The node of claim 11, wherein the first piece of cellular information comprises cell identity information.

20. The node of claim 11, wherein the second piece of cellular information comprises frame number information.

21. A computer program product comprising instructions stored on non-transient computer-readable media which, when executed by one or more processors, perform the acts of:

receiving a signal;

collecting a first set of sequences corresponding to a first piece of cellular information and a second set of sequences corresponding to a second piece of cellular information over multiple frames of the received signal, the first set of sequences comprising a plurality of different versions of a first portion of the received signal corresponding to the first piece of cellular information and the second set of sequences comprising a plurality of different versions of a second portion of the received signal corresponding to the second piece of cellular information, wherein the second piece of cellular information is encoded based at least in part on the first piece of cellular information;

processing the first set of sequences corresponding to the first piece of cellular information to determine the first piece of cellular information;

processing, using the determined first piece of cellular information, the second set of sequences corresponding to the second piece of cellular information to determine the second piece of cellular information simultaneously with the determination of the first piece of cellular information.

22. The computer program product of claim 21, wherein the act of collecting (608) the first set of sequences corresponding to the first piece of cellular information and the second set of sequences corresponding to the second piece of cellular information over multiple frames of the received signal comprises:

extracting, from a first frame of the received signal, a first version of the first portion of the received signal corresponding to the first piece of cellular information and a first version of the second portion of the received signal corresponding to the second piece of cellular information; and extracting, from a second frame of the received signal, a second version of the first portion of the received signal corresponding to the first piece of cellular information and a second version of the second portion of the received signal corresponding to the second piece of cellular information; and wherein the computer program product further comprises instructions which, when executed by the one or more processors, perform the act of storing, in a memory, the first and second versions of the second portion of the received signal corresponding to the second piece of cellular information.

23. The computer program product of claim 22, wherein the act of processing the first set of sequences corresponding to the first piece of cellular information to determine the first piece of cellular information comprises:

correlating the first version of the first portion of the received signal corresponding to the first piece of cellular information with one or more sequences to produce a first output, the first output comprising a set of correlation values;

correlating the second version of the first portion of the received signal corresponding to the first piece of cellular information with one or more sequences to produce a second output, the second output comprising a set of correlation values;

combining the first output and the second output to obtain a first set of accumulated correlation values; and determining the first piece of cellular information based at least in part on the first set of accumulated correlation values.

24. The computer program product of claim 22, wherein the act of processing, using the determined first piece of cellular information, the second set of sequences corresponding to the second piece of cellular information to determine the second piece of cellular information simultaneous with the determination of the first piece of cellular information comprises:

applying the first piece of cellular information to the stored first and second versions of the second portion of the received signal corresponding to the second piece of cellular information to generate modified first and second versions of the second portion of the received signal, wherein the modified first and second versions of the second portion of the received signal are no longer dependent on the first piece of cellular information;

correlating the modified first version of the second portion of the received signal corresponding to the second piece of cellular information with a first set of sequences based on a first set of frame number hypotheses to obtain a first set of correlation values;

correlating the modified second version of the second portion of the received signal corresponding to the second piece of cellular information with a second set of sequences based on a second set of frame number hypotheses to obtain a second set of correlation values;

combining the first set of correlation values and the second set of correlation values to generate a second set of accumulated correlation values; and determining the second piece of cellular information based at least in part on the generated second set of accumulated correlation values.

25. The computer program product of claim 21, wherein:

the first piece of cellular information comprises cell identity information; and the second piece of cellular information comprises frame number information.

* * * * *